United States Patent
Wu

(10) Patent No.: US 11,287,968 B2
(45) Date of Patent: Mar. 29, 2022

(54) CAPACITIVE TOUCH SENSOR WITH NON-CROSSING CONDUCTIVE LINE PATTERN

(71) Applicant: Google LLC, Mountain View, CA (US)

(72) Inventor: Tong Wu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/764,979

(22) PCT Filed: Apr. 4, 2019

(86) PCT No.: PCT/US2019/025781
§ 371 (c)(1),
(2) Date: May 18, 2020

(87) PCT Pub. No.: WO2020/204929
PCT Pub. Date: Oct. 8, 2020

(65) Prior Publication Data
US 2022/0011933 A1    Jan. 13, 2022

(51) Int. Cl.
*G06F 3/0488* (2013.01)
*G06F 3/041* (2006.01)
(Continued)

(52) U.S. Cl.
CPC .......... *G06F 3/04883* (2013.01); *G06F 3/011* (2013.01); *G06F 3/016* (2013.01);
(Continued)

(58) Field of Classification Search
None
See application file for complete search history.

(56) References Cited

U.S. PATENT DOCUMENTS

| 2009/0128518 A1 | 5/2009 | Kinoshita et al. |
| 2018/0059825 A1 | 3/2018 | Moseley |

(Continued)

FOREIGN PATENT DOCUMENTS

| CN | 102902387 | 1/2013 |
| CN | 103677363 | 3/2014 |

(Continued)

OTHER PUBLICATIONS

International Search Report and Written Opinion for Application No. PCT/US2019/025781, dated Dec. 3, 2019, 12 pages.

*Primary Examiner* — Stephen T. Reed
(74) *Attorney, Agent, or Firm* — Dority & Manning, P.A.

(57) ABSTRACT

Systems and methods for interactive objects including conductive lines are provided. An interactive object may comprise a capacitive touch sensor comprising two or more non-crossing conductive lines that form at least a first conductive line pattern. The first conductive line pattern may comprise a first, second, and third sequence of the two or more non-crossing conductive lines relative to a respective first, second, and third input direction. The interactive object may be configured to detect touch input to the capacitive touch sensor based on a change in capacitance associated with the two or more non-crossing conductive lines, identify at least one of the first, second, or third line sequence based on the touch input to the capacitive touch sensor, and determine a respective gesture corresponding to the first, second, or third sequence of two or more non-crossing conductive lines.

20 Claims, 13 Drawing Sheets

(51) Int. Cl.
*G06F 3/01* (2006.01)
*G06F 3/0485* (2013.01)
*G06F 3/044* (2006.01)
*G06F 3/04883* (2022.01)

(52) U.S. Cl.
CPC ............ *G06F 3/044* (2013.01); *G06F 3/0416* (2013.01); *G06F 3/0485* (2013.01)

(56) References Cited

U.S. PATENT DOCUMENTS

2018/0267662 A1   9/2018  Mei et al.
2019/0208837 A1*  7/2019  Poupyrev .............. G06F 3/0446

FOREIGN PATENT DOCUMENTS

JP        2012243513    12/2012
WO   WO2007/094993   8/2007

* cited by examiner

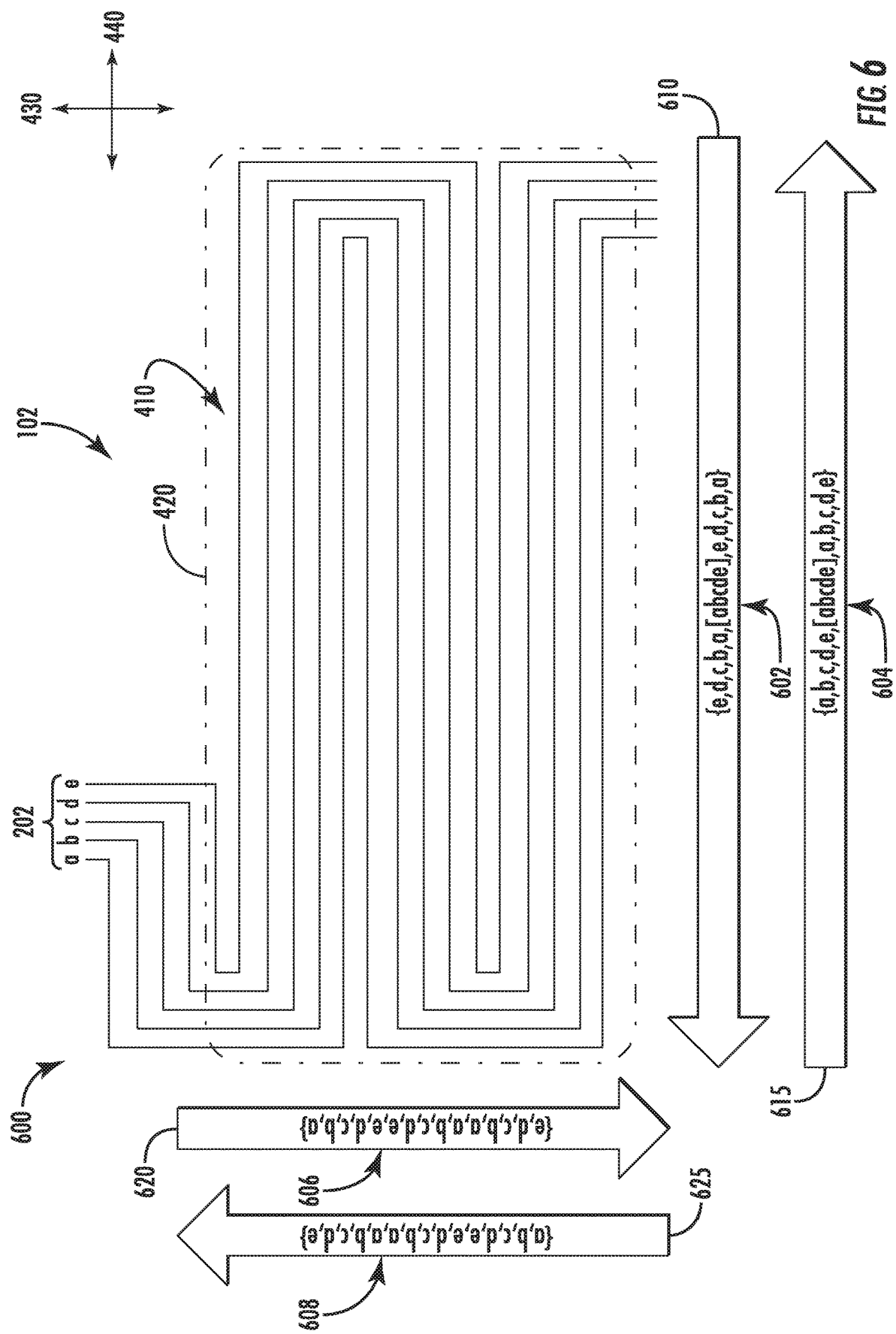

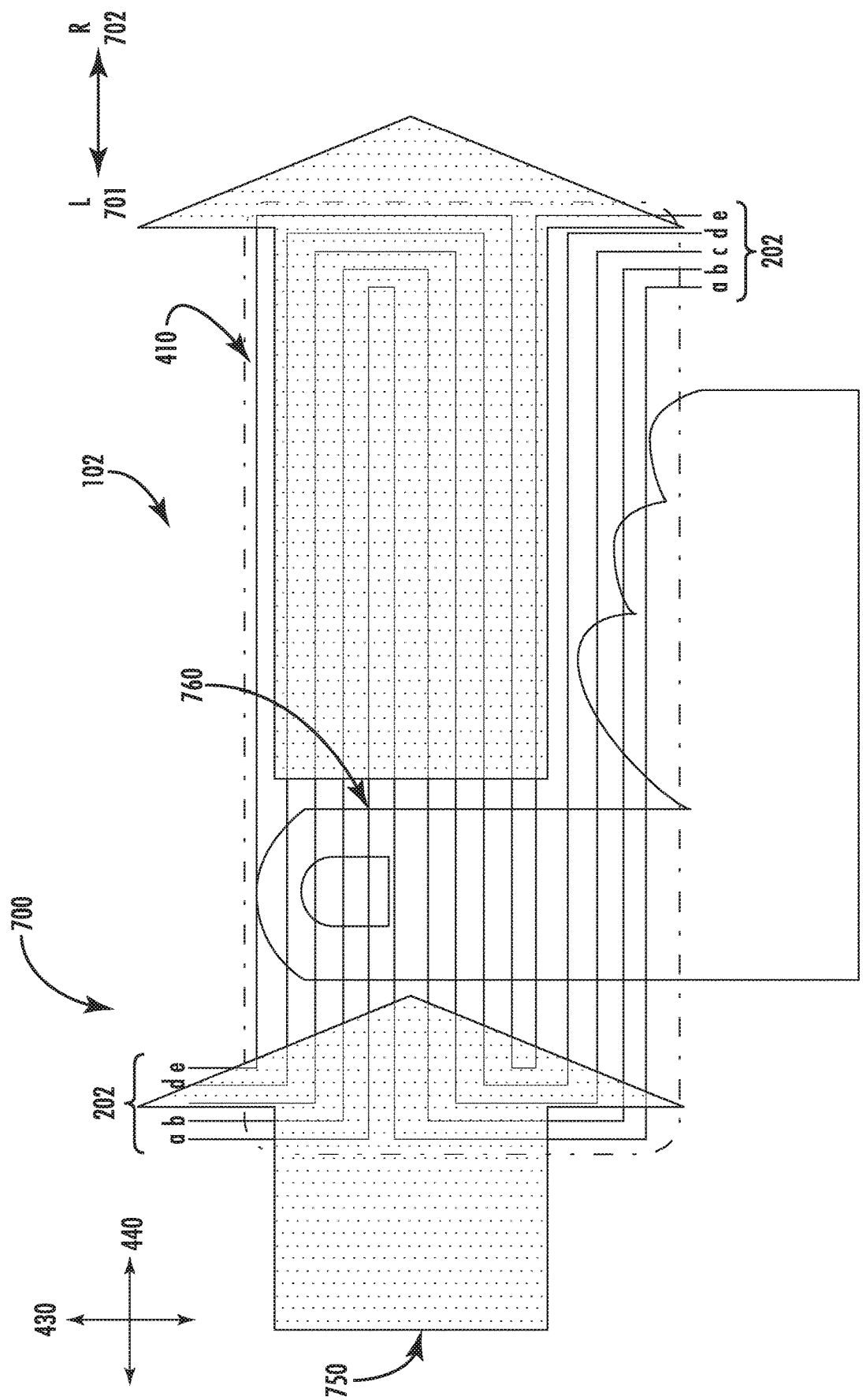

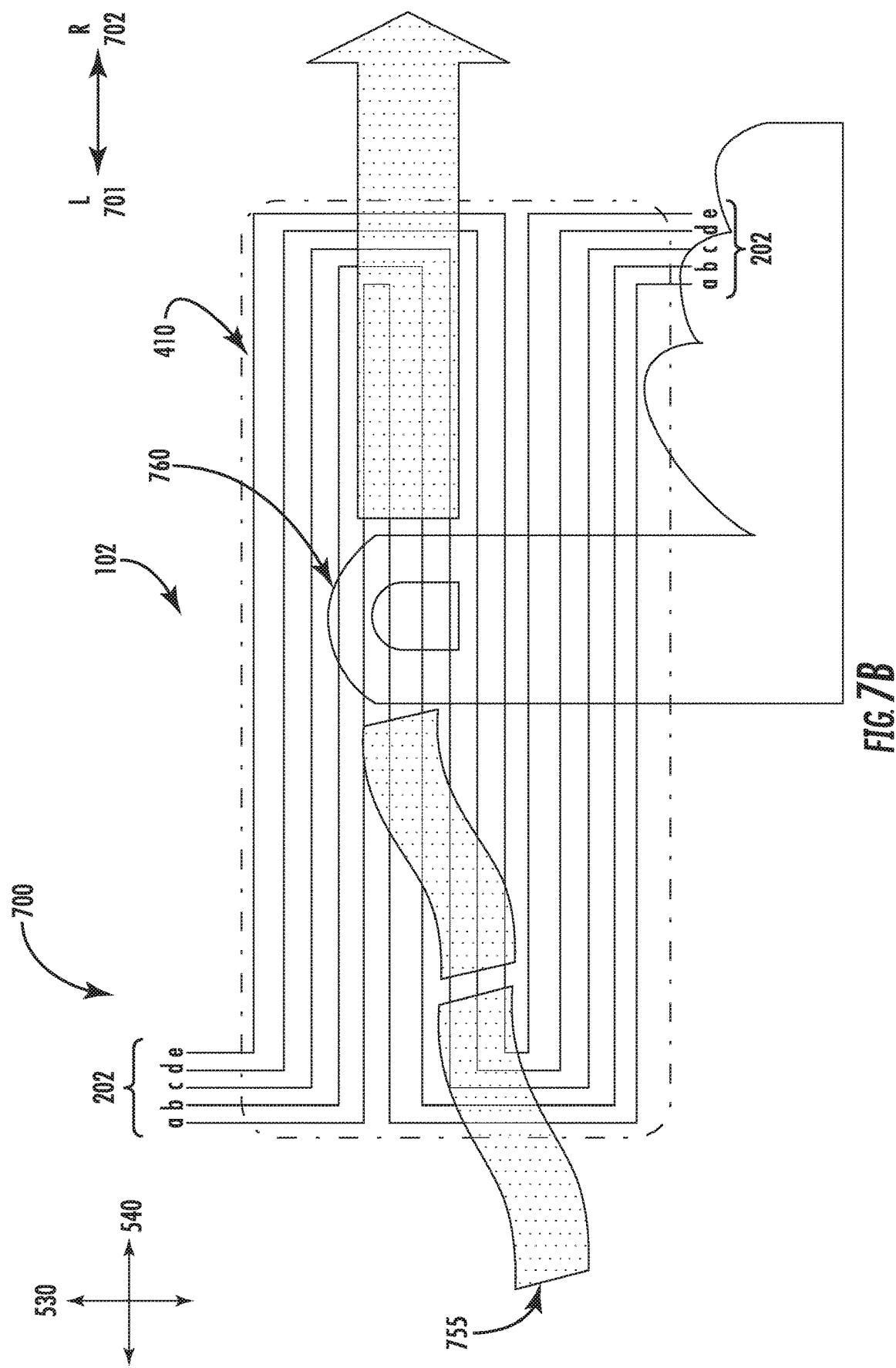

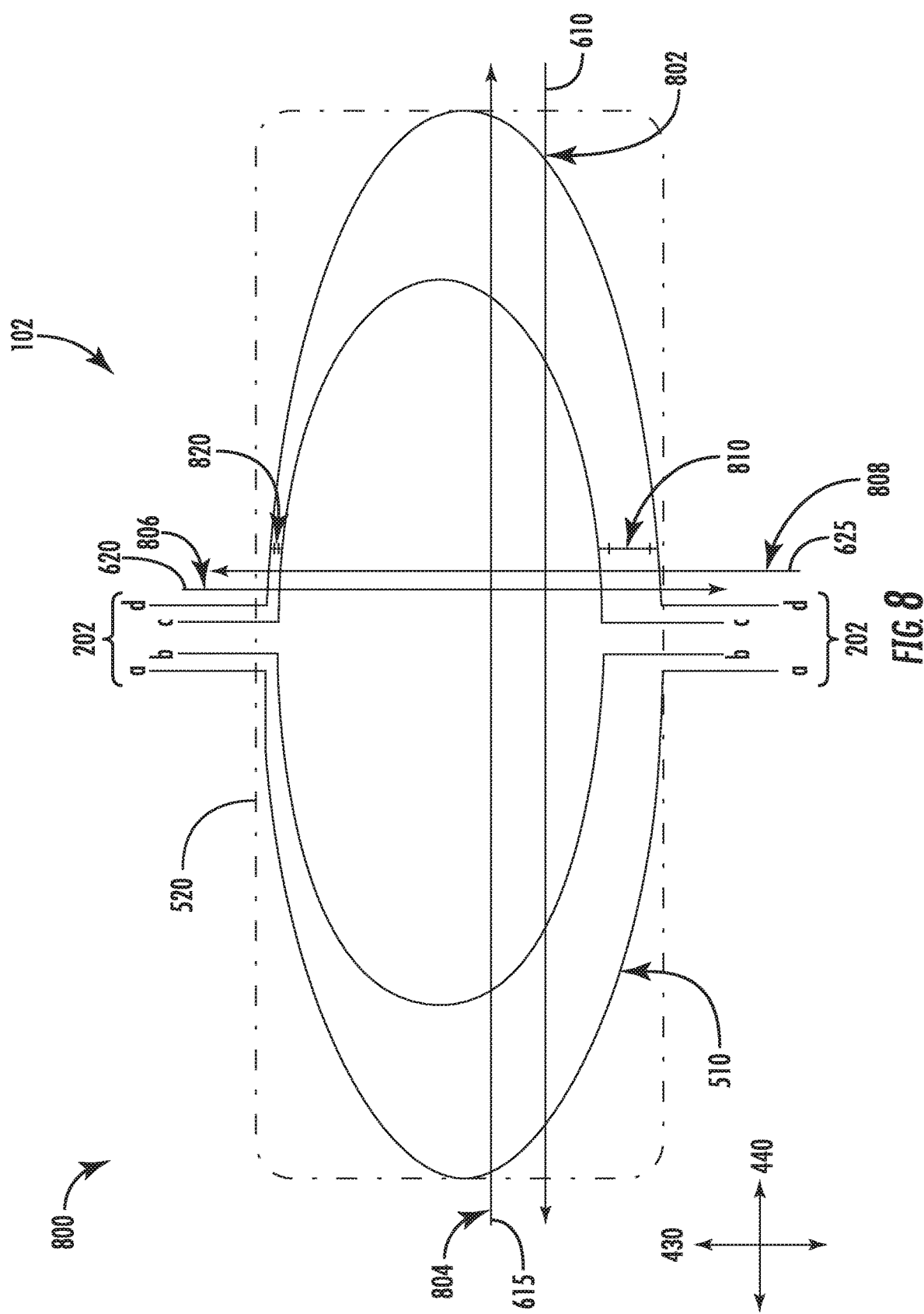

CAPACITIVE TOUCH SENSOR WITH NON-CROSSING CONDUCTIVE LINE PATTERN

PRIORITY CLAIM

The present application is based upon and claims the right of priority under 35 U.S.C. § 371 to International Application No. PCT/US2019/025781, having a filing date of Apr. 4, 2019. Applicant claims priority to and the benefit of International Application No. PCT/US2019/025781 and incorporates such application herein by reference in its entirety.

FIELD

The present disclosure relates generally to interactive objects that include touch sensors.

BACKGROUND

An interactive object includes conductive lines such as conductive threads incorporated into the interactive object to form a sensor such as a capacitive touch sensor that is configured to detect touch input. The interactive object can process the touch input to generate touch data that is useable to initiate functionality locally at the interactive object or at various remote devices that are wirelessly coupled to the interactive object. Interactive objects may include conductive lines for other purposes, such as for strain sensors using conductive threads and for visual interfaces using line optics.

An interactive object may be formed by forming a grid or array of conductive thread woven into an interactive textile, for example. Each conductive thread can include a conductive wire (e.g., a copper wire) that is twisted, braided, or wrapped with one or more flexible threads (e.g., polyester or cotton threads). It may be difficult, however, for traditional sensor designs with such conductive lines to detect a sufficient number of distinguishable inputs to provide a useful device. In order to detect complex and/or a larger number of inputs, complex array designs have traditionally been required.

SUMMARY

Aspects and advantages of embodiments of the present disclosure will be set forth in part in the following description, or may be learned from the description, or may be learned through practice of the embodiments.

One example aspect of the present disclosure is directed to a computing system including a capacitive touch sensor. The capacitive touch sensor includes two or more non-crossing conductive lines that form at least a first conductive line pattern at at least a first area of the capacitive touch sensor. The first conductive line pattern includes a first line sequence of the two or more non-crossing conductive lines relative to a first input direction, a second line sequence of the two or more non-crossing conductive lines relative to a second input direction, and a third line sequence of the two or more non-crossing conductive lines relative to a third input direction. The computing system includes one or more computer-readable media that store instructions that, when executed by one or more processors, cause the one or more processors to perform operations. The operations include obtaining touch data indicative of a touch input to the capacitive touch sensor. The touch data is based at least in part on a change in capacitance associated with the two or more non-crossing conductive lines. The operations include identifying at least one of the first line sequence, the second line sequence, or the third line sequence based on the touch data. The operations include determining a respective gesture corresponding to at least one of the first line sequence, the second line sequence, or the third line sequence.

Another example aspect of the present disclosure is directed to a computer-implemented method of determining a user gesture. The method includes obtaining, by one or more computing devices, data indicative of a touch input to a capacitive touch sensor. The capacitive touch sensor includes two or more non-crossing conductive lines forming at least a first line sequence, a second line sequence, and a third line sequence at a first area of the capacitive touch sensor. The method includes comparing, by the one or more computing devices, the data indicative of the touch input with reference data corresponding to the first line sequence, the second line sequence, and the third line sequence. The method includes detecting, by the one or more computing devices, a correspondence between the touch input and at least one of the first line sequence, the second line sequence, or the third line sequence based on comparing the data indicative of the touch input with the reference data. The method includes identifying, by the one or more computing devices, a respective gesture corresponding to the at least one of the first line sequence, the second line sequence, or the third line sequence based on detecting the correspondence. The method includes initiating, by the one or more computing devices, one or more actions based at least in part on the respective gesture.

Yet another example aspect of the present disclosure is directed to a computing device. The computing device includes one or more processors. The computing device includes one or more communication interfaces communicatively coupled to at least one capacitive touch sensor. The at least one capacitive touch sensor includes two or more non-crossing conductive lines. The two or more non-crossing conductive lines form at least a first line sequence, a second line sequence, and a third line sequence at a first area of the at least one capacitive touch sensor. The computing device includes one or more computer-readable media that store instructions that, when executed by the one or more processors, cause the one or more processors to perform operations. The operations include detecting touch input to the capacitive touch sensor based on a change in capacitance associated with the two or more non-crossing conductive lines. The operations include identifying at least one of the first line sequence, the second line sequence, or the third line sequence in response to the touch input to the capacitive touch sensor. The operations include determining a respective gesture corresponding to at least one of the first line sequence, the second line sequence, or the third line sequence. The operations include initiating one or more actions based at least in part on the respective gesture.

Other example aspects of the present disclosure are directed to systems, methods, interactive objects, textiles, apparatuses, tangible, non-transitory computer-readable media, and memory devices for determining a user gesture.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 6 depicts an example of a capacitive touch sensor including non-crossing conductive lines configured to detect gestures in multiple input directions in accordance with example embodiments of the present disclosure.

FIG. 7a depicts an example gesture applied to a capacitive touch sensor in accordance with example embodiments of the present disclosure.

FIG. 7b depicts an example gesture applied in a general direction across capacitive touch sensor in accordance with example embodiments of the present disclosure.

FIG. 8 depicts another example of a capacitive touch sensor including non-crossing conductive lines that configured to detect gestures in multiple input directions in accordance with example embodiments of the present disclosure.

DETAILED DESCRIPTION

Figure 1:
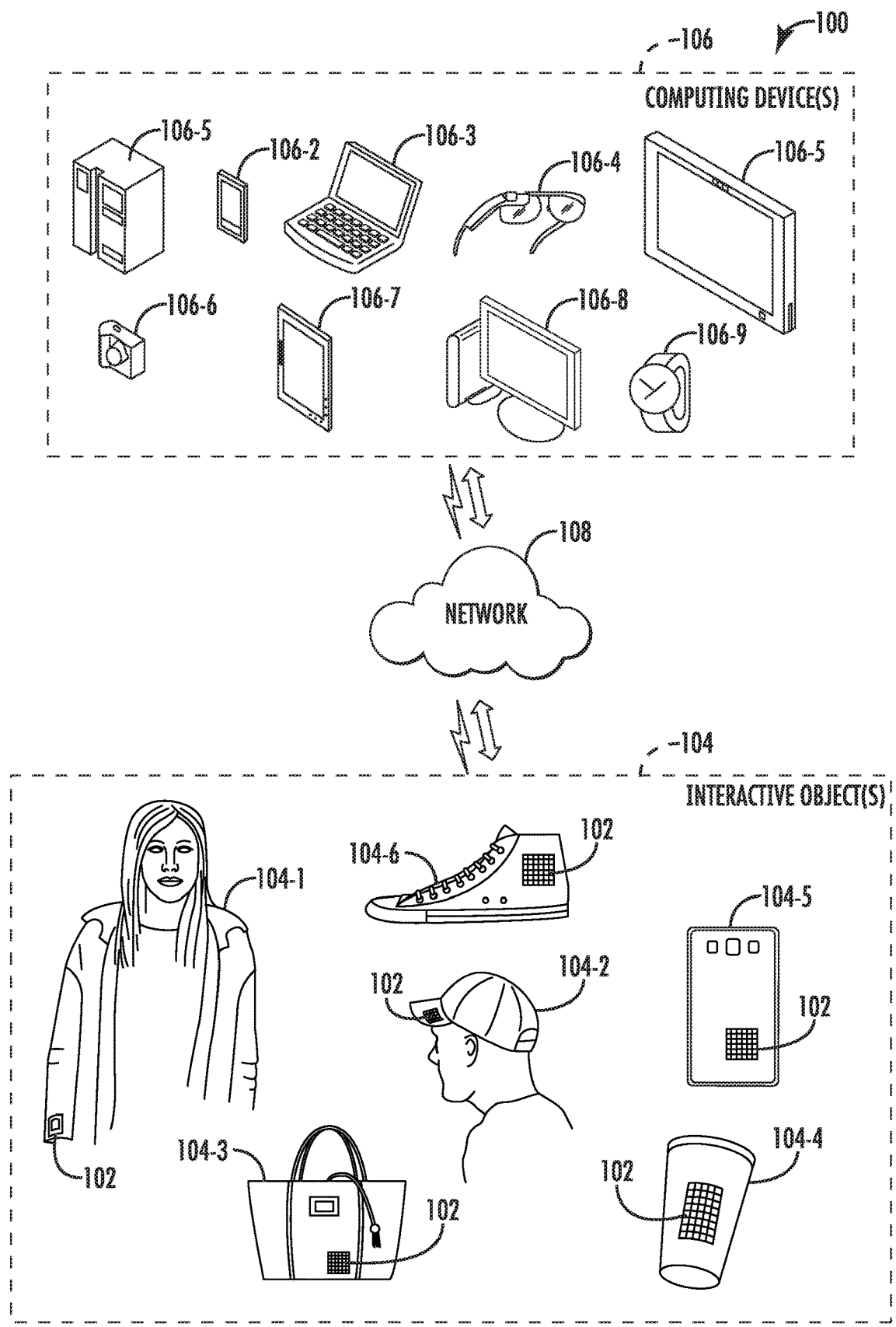
FIG. 1 depicts a block diagram of an example computing environment including an interactive object including a capacitive touch sensor in accordance with example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to a capacitive touch sensor that includes a set of non-crossing conductive lines that enable the detection of user inputs in different directions. The non-crossing lines form a conductive line pattern where the non-crossing lines extend in one or more directions without overlapping. In this manner, a simple sensor array can be fabricated that is not grid-based, but that enables the detection of touch inputs in different directions such that gestures with directional components in multiple dimensions can be identified. The capacitive touch sensor can include non-crossing conductive lines that form a first conductive line pattern at at least a first area of the touch input sensor. The first conductive line pattern at the first area of the touch input sensor can include a first line sequence of the conductive lines relative to a first input direction, a second line sequence of the conductive lines relative to a second input direction, and a third line sequence of the conductive lines relative to a third input direction. The conductive line pattern may define additional sequences relative to additional input directions. Each line sequence can include a particular order and/or number of the non-crossing lines. In some examples, each sequence can include a particular spacing or distance between the non-crossing lines. For example, each line sequence can include a distinct order of lines, number of lines, and/or spacing between one or more lines in the sequence, etc.

According to some implementations, an interactive object comprising a capacitive touch sensor can detect multi-dimensional touch input to a set of non-crossing conductive lines forming the capacitive touch sensor. The interactive object can identify at least a portion of a sequence of the non-crossing lines based on the touch input and determine a respective gesture corresponding to the identified line sequence. For example, each line sequence can be associated with a respective gesture. In this manner, a particular one of a plurality of user gestures (e.g., in multiple dimensions) can be determined based on identifying a corresponding one of a plurality of different line sequences in response to a touch input.

Any type of conductive line can be used in accordance with example embodiments of the present disclosure. By way of example, a conductive line can include a conductive thread, conductive fiber, fiber optic filaments, flexible metal lines, etc. A conductive thread of an interactive textile may include a conductive core that includes at least one conductive wire and a cover layer constructed from flexible threads that cover the conductive core. The conductive core may be formed by twisting one or more flexible threads (e.g., silk threads, polyester threads, or cotton threads) with the conductive wire, or by wrapping flexible threads around the conductive wire. In some implementations, the conductive core may be formed by braiding the conductive wire with flexible threads (e.g., silk). The cover layer may be formed by wrapping or braiding flexible threads around the conductive core. In some implementations, the conductive thread is implemented with a "double-braided" structure in which the conductive core is formed by braiding flexible threads with a conductive wire, and then braiding flexible threads around the braided conductive core. Other types of conductive lines may be used in accordance with embodiments of the disclosed technology. For example, a conductive line can be used to transmit and/or emit light, such as in line optic applications. Although many examples are provided with respect to conductive threads, it will be appreciated that any type of conductive line can be used with the capacitive touch sensor according to example embodiments.

According to example embodiments, the interactive object can include a capacitive touch sensor configured to receive touch input from one or more users. The capacitive touch sensor can include two or more non-crossing conductive lines that form at least a first pattern at an area of the capacitive touch sensor. The first pattern can include any suitable pattern of lines that are formed in a non-crossing manner. For example, the non-crossing lines can form a conductive line pattern without intersecting, touching, or crossing underneath or over one another at the area of the capacitive touch sensor. In this manner, the capacitive touch sensor can be formed with a simplified architecture while enabling the detection of inputs in multiple directions. Such an architecture can lower the cost of producing capacitive touch sensors that utilize conductive lines while, at the same time, increasing the efficiency and lowering the space requirements of capacitive touch sensors. For instance, capacitive touch sensors with crossing conductive lines may utilize insulation to decrease interference among the one or more crossing lines. Additionally, such crossing architectures may utilize an increased number of lines as well as an increased number of circuitry connections to enable the detection of inputs in multiple directions. By including a capacitive touch sensor with two or more non-crossing lines, example embodiments in accordance with the present disclosure can provide a simplified sensor architecture capable of multi-dimensional input detection that typically requires more complex architectures.

In accordance with some implementations, two or more non-crossing conductive lines can be configured as a conductive line pattern at an area of the capacitive touch sensor. The two or more non-crossing lines can extend parallel to one another along a longitudinal axis defined by the capacitive touch sensor at a first portion of the capacitive touch sensor. In addition, the two or more non-crossing conductive lines can extend parallel to one another along a lateral axis defined by the capacitive touch sensor to form a second portion of the capacitive touch sensor at the area. A touch input applied at the area of the capacitive touch sensor can generate touch data that can be used to discriminate multiple gestures provided in different dimensions. For example, swipe inputs across the conductive line pattern in opposite first and second directions can be identified. For example, the first direction may generally be left to right along the lateral axis. The second direction may generally be right to left along the lateral axis. Additionally, swipe inputs across the conductive line pattern in opposite third and fourth directions can be identified. The third and fourth directions can be orthogonal to the first and second direction. For example, the third direction may generally be downward along the longitudinal axis. The fourth direction may generally be upward along the longitudinal axis. A capacitive touch sensor in accordance with example embodiments may be able to identify fewer or additional gestures than those described. A capacitive touch sensor as described including non-crossing conductive lines may form an array that can be used to detect various gesture inputs, authentication inputs, predefined keystrokes, movements, user-specific natural behaviors and the like. One or more machine-learned models may be used to detect user inputs based on training the machine-learned models using training data. Additionally, the touch sensor may be configured to detect analog and pseudo-force inputs from a capacitive change caused by a finger distance.

According to some example embodiments, the conductive line pattern formed by the two or more non-crossing conductive lines can form a serpentine pattern at a first area of the capacitive touch sensor. By way of example, the two or more non-crossing lines can extend in parallel along a longitudinal axis at a first portion of the capacitive touch sensor. The two or more non-crossing lines may extend in parallel along a lateral axis at a second portion of the capacitive touch sensor. Each conductive line can be formed continuously from the first portion to the second portion. The two or more non-crossing lines may extend in parallel along the longitudinal axis at a third portion of the capacitive touch sensor. Each conductive line can be formed continuously from the second portion to the third portion. At the first area, the two or more non-crossing lines can define a first line sequence relative to a first input direction corresponding to the lateral axis and a second line sequence relative to a second input direction corresponding to the lateral axis. The first input direction and the second input direction can be opposite directions along the lateral axis in example embodiments. At the first area, the two or more non-crossing lines can also define a third line sequence relative to a third input direction corresponding to the longitudinal axis and a fourth line sequence relative to a fourth input direction corresponding to the longitudinal axis. The third input direction and the fourth input direction can be opposite directions along the longitudinal axis in example embodiments. The third input direction and the fourth input direction can be orthogonal to the first input direction and the second input direction in example embodiments.

In some examples, the conductive line pattern formed by the two or more non-crossing conductive lines can form a series of partial ellipses. By way of example, the two or more non-crossing conductive lines can form at least one outer ellipse and at least one inner ellipse (e.g., inside the outer ellipse) without crossing. For example, the inner ellipse can extend within the outer ellipse. In addition, or alternatively, the inner ellipse can extend uniformly off centered such that the space between each of the non-crossing conductive lines varies depending on the direction across the conductive line pattern.

Each sequence of lines (also referred to as a line sequence) can include one or more sequence features. The one or more sequence features can include features such as, for example, a particular order of non-crossing conductive lines, a particular number of non-crossing conductive lines, one or more distances between two or more non-crossing conductive lines, etc. For example, the one or more of the sequence features can include a particular order of non-crossing conductive lines in the set of non-crossing lines forming the capacitive touch sensor. For example, the sequence features can include a particular order of the non-crossing conductive lines at a given portion of the conductive line pattern corresponding to the particular sequence. For instance, each line sequence can include at least one order of non-crossing conductive lines in a particular direction across the conductive line pattern. In an example embodiment, each line sequence can include a different order of non-crossing conductive lines forming the conductive line pattern. For example, the order of non-crossing conductive lines can be relative to a direction across the capacitive touch sensor. In this manner, in an example embodiment, the particular line sequence can be utilized to identify a particular direction.

Additionally, or alternatively, the one or more sequence features for a particular line sequence can include one or more distances associated with the conductive line pattern. For example, the one or more distances can include a spacing between two or more non-crossing conductive lines at a given portion of the conductive line pattern corresponding to the particular sequence. For example, the conductive line pattern can include different distances between non-crossing conductive lines at portions of the capacitive touch sensor corresponding to different conductive line sequences. By way of example, a first portion of the conductive line pattern corresponding to a first line sequence can have a different spacing between non-crossing conductive lines than a second portion of the conductive line pattern corresponding to a second line sequence. For instance, the non-crossing conductive lines forming the first portion of the conductive line pattern can be spaced apart a first distance and the non-crossing conductive lines forming the second portion of the conductive line pattern can be spaced apart a second distance. In an example embodiment, each line sequence can include at least two non-crossing conductive lines and a distance between the two or more conductive lines. In addition, or alternatively, each line sequence can include a particular order of two or more non-crossing lines and a distance between each of the two or more non-crossing lines in the particular order.

In addition, or alternatively, the one or more sequence features for a particular line sequence can include a particular number of non-crossing conductive lines in the set of non-crossing conductive lines forming the conductive line pattern. For instance, the sequence features can include a particular number of non-crossing conductive lines at a given portion of the conductive line pattern corresponding to the particular sequence. By way of example, the conductive line pattern can include a different number of non-crossing conductive lines in one or more portions of the capacitive touch sensor. For example, each line sequence can include a different number of non-crossing conductive lines in the set of non-crossing conductive lines forming the conductive line pattern. For instance, in an example embodiment, each line sequence can include a particular number of conductive lines, a particular order of the particular number of conductive lines, and a spacing between each of the number of conductive lines.

In an example embodiment, the non-crossing conductive lines can form a conductive line pattern including at least a first sequence of the non-crossing conductive lines relative to a first input direction. The first sequence of the non-crossing conductive lines can extend in a direction orthogonal to the first input direction. By way of example, the first input direction can intersect, at least in part, the first sequence of non-crossing conductive lines. The conductive line pattern can include at least a second sequence of the non-crossing conductive lines relative to a second input direction. In an example embodiment, the second sequence of the non-crossing conductive lines can extend in a direction orthogonal to the second input direction. By way of example, the second input direction can intersect, at least in part, the second sequence of non-crossing conductive lines.

In an example embodiment, the first input direction and the second input direction can be opposite directions along a common axis. For example, the non-crossing conductive lines of the capacitive touch sensor can define a lateral and a longitudinal axis corresponding to the conductive line pattern. In an example embodiment, the first line sequence and the second sequence of lines can each include a sequence of lines along the lateral axis of the conductive line pattern. By way of example, the conductive line pattern can include a first sequence of lines relative to a first input direction in a first lateral direction along the capacitive touch sensor. Additionally, or alternatively, the conductive line pattern can include a second line sequence relative to a second input direction in a second lateral direction (e.g., opposite to the first lateral direction) along the capacitive touch sensor. In this manner, the conductive line pattern can include at least one line sequence relative to each direction along a first (e.g., lateral) dimension.

The conductive line pattern can include at least a third sequence of the non-crossing conductive lines relative to a third input direction. In an example embodiment, the third sequence of the non-crossing conductive lines can extend in a direction orthogonal to the third input direction. By way of example, the third input direction can intersect, at least in part, the third sequence of the non-crossing conductive lines. In addition, or alternatively, the non-crossing conductive lines can form a conductive line pattern including at least a fourth sequence of the non-crossing conductive lines relative to a fourth input direction. In an example embodiment, the fourth sequence of the non-crossing conductive lines can extend in a direction orthogonal to the fourth input direction. By way of example, the fourth input direction can intersect, at least in part, the fourth sequence of the non-crossing conductive lines.

In an example embodiment, the third input direction and the fourth input direction can be opposite directions along a common axis. For example, the third line sequence and the fourth line sequence can be defined relative to the longitudinal axis. The conductive line pattern can include a third line sequence relative to a third input direction in a first longitudinal direction. Additionally, or alternatively, the conductive line pattern can include a fourth line sequence relative to a fourth input direction in a second longitudinal direction (e.g., opposite to the first longitudinal direction). The third input direction (e.g., a longitudinal direction) can be orthogonal to the first input direction and the second input direction (e.g., a lateral direction). In this manner, the conductive line pattern can include at least one line sequence relative to each direction along a second (e.g., longitudinal) dimension.

The conductive line pattern can include any number of sequences of lines in any number of portions of the capacitive touch sensor. For example, the conductive line pattern can include one or more line sequences in addition to the first, second, third, and fourth line sequences. By way of example, the conductive line pattern can include at least a fifth and/or sixth line sequence. For example, conductive line pattern can include a fifth line sequence relative to a fifth input direction. The fifth input direction can be between the first and third input directions. In addition, or alternatively, the conductive line pattern can include a sixth line sequence relative to a sixth input direction. The fifth and sixth input directions can be opposite directions along a common axis.

According to example embodiments, the interactive object and/or one or more computing devices in communication with the interactive object can detect a user gesture based at least in part on input to the capacitive touch sensor. For example, the interactive object and/or the one or more computing devices can implement a gesture manager that can identify one or more gestures in response to touch input to the capacitive touch sensor. According to some example implementations, an interactive object including a capacitive touch sensor can include an internal electronics module that is integrated into the interactive object (e.g., garment, garment accessory, hard object, etc.). The capacitive touch sensor can be directly attached to the internal electronics module or can be attached to the internal electronics module via one or more connector components. The internal electronics module can include electronic components, such as sensing circuitry configured to detect touch input to the conductive lines. The internal electronics module can include one or more drivers and can provide power and/or control signals to the conductive lines. The internal electronics module may not include an on-board power source in some embodiments. A removable electronics module can supply power to the internal electronics module. The sensing circuitry in some examples comprises a controller that is configured to detect a touch input when user pressure is applied to the conductive lines, for example. The internal electronics module can be configured to communicate the touch input data to a computing device such as a removable electronics module or one or more remote computing devices. In some examples, the controller comprises a flexible printed circuit board (PCB) including a microprocessor. The printed circuit board can include a set of contact pads for attaching to the conductive lines.

In some embodiments, a removable electronics module includes a second subset of electronic components (e.g., a microprocessor, power source, or network interface). The removable electronics module can be removably coupled to the interactive object via a communication interface. The communication interface enables communication between the internal electronics module and the removable electronics module when the removable electronics module is coupled to the interactive object. In example embodiments, the removable electronics module can be removably mounted to a rigid member on the interactive object. A connector can include a connecting device for physically and electrically coupling to the removable electronics module. The internal electronics module can be in communication with the connector. The internal electronics module can be configured to communicate with the removable electronics module when connected to the connector. A controller of the removable electronics module can receive information and send commands to the internal electronics module. A communication interface is configured to enable communication between the internal electronics module and the controller when the connector is coupled to the removable electronics module. For example, the communication interface may comprise a network interface integral with the removable electronics module. The removable electronics module can also include a rechargeable power source. The removable electronics module can be removable from the interactive cord for charging the power source. Once the power source is charged, the removable electronics module can then be placed back into the interactive cord and electrically coupled to the connector.

The interactive object can detect touch input to the capacitive touch sensor based on a change of capacitance associated with the two or more non-crossing conductive lines. For example, a user can activate one or more of the two or more non-crossing conductive lines by moving an object (e.g., finger, conductive stylus, etc.) across the capacitive touch sensor. By way of example, the capacitance associated with each of the two or more non-crossing conductive lines can change when touched by a user. The interactive object can generate data indicative of one or more activations (e.g., changes in capacitance) associated with the at least one of the non-crossing conductive lines forming the conductive line pattern.

In an example embodiment, sensing circuitry of the internal electronics module can generate touch data in response to touch input. The touch data can include data indicative of a line that was touched and optionally a time associated with the touch. The touch data may indicate a capacitance level associated with the touch. Data indicative of one or more touch input features may be included with or determined from the touch data. The one or more touch input features can include, for example, an order of non-crossing conductive lines, a number of non-crossing conductive lines, or one or more times corresponding to one or more of the non-crossing conductive lines. For example, each of the one or more touch input features can correspond to a particular touch input at a given portion of the capacitive touch sensor at a given time. By way of example, the one or more times corresponding to one or more of the non-crossing conductive lines can include a time stamp, and/or a time period associated with a change in capacitance of a particular conductive line. In addition, or alternatively, the one or more times can correspond to one or more time periods in between a change in capacitance of two particular conductive lines.

The interactive object (e.g., the internal electronics module and/or the removable electronics module) and/or one or more computing devices in communication with the interactive object can be configured to analyze the touch data to identify one or more touch input features associated with the touch input. For example, an order in which the two or more non-crossing conductive lines are activated can be determined from the touch data. In addition, or alternatively, one or more times corresponding to a touch to one or more of the non-crossing conductive lines can be determined. The one or more times can correspond to a period of time in between a change in capacitance associated with the two or more non-crossing conductive lines during the touch input to the capacitive touch sensor. In an example embodiment, each of the one or more time periods can correspond to a respective distance between the at least one conductive line. In this manner, at least one of a number of activated lines, an order of activated lines, or a distance between at least one of the activated lines can be determined.

The interactive object and/or a computing device in communication with the interactive object can identify at least one line sequence based on the touch input. In an example embodiment, at least one line sequence can be identified based on a number of activations, an order of activations, and/or a determined distance between activations. For example, at least one of the first line sequence, the second line sequence, or the third line sequence can be identified based on the touch input to the capacitive touch sensor. By way of example, the line sequence can include at least a portion of the first line sequence, the second line sequence, or the third line sequence.

The interactive object and/or a computing device in communication with the interactive object can identify at least one line sequence based at least in part on reference data. For example, the reference data can include data indicative of one or more sequence features corresponding to at least one line sequence. The reference data can be stored in a reference database in association with one or more sequences of lines. In addition, or alternatively, the reference database can include data indicative of one or more gestures corresponding to each of the one or more sequences of lines. The reference database can be stored on the interactive object (e.g., in memory on the capacitive touch sensor, the controller, or both) and/or remote from the interactive object on one or more remote computing devices.

The interactive object and/or a computing device in communication with the interactive object can compare the touch data indicative of the touch input with the reference data corresponding to at least one line sequence. For example, the interactive object and/or a computing device in communication with the interactive object can compare touch input features of the touch input to the reference data indicative of one or more sequence features. By way of example, the touch input features can be compared against sequence features stored in the reference database to determine a correspondence between the touch data and one or more sequences of lines.

The interactive object and/or a computing device in communication with the interactive object can detect a correspondence between the touch input and at least one line sequence (e.g., the first line sequence, the second line sequence, or the third line sequence). For example, one or more corresponding features between the touch data indicative of the touch input and at least one of the line sequence (e.g., the first, second, or third sequences of lines) can be identified. By way of example, corresponding features can include at least one touch input feature and at least one sequence feature that meet a matching criteria. A similarity between a touch data indicative of the touch input and a respective line sequence can be determined. For example, the similarity between the touch input and the respective line sequence can be determined based on a number of corresponding features identified from the touch input features associated with the touch input and the respective sequence features. In some examples, a correspondence between the touch data indicative of the touch input and a line sequence can be detected based on a respective line sequence associated with the largest number of corresponding features.

The interactive object and/or a computing device in communication with the interactive object can determine a respective gesture corresponding to a line sequence identified in response to a touch input. By way of example, an identifier for each line sequence can be stored in a reference database with an identification of a respective gesture. For example, a gesture corresponding to a detected line sequence can be identified.

In an example embodiment, touch data indicative of a touch input can be input into a machine learned gesture model configured to output a detection of at least one gesture corresponding to a detection of at least one line sequence. The machine learned gesture model may generate data indicative of input features in order to identify a line sequence and output a gesture detection based on the touch data. The machine learned gesture model can be trained, via one or more machine learning techniques, using the reference data as one or more constraints. For example, the machine learned gesture model can be trained to detect particular gestures based on the physical constraints of the capacitive touch sensor. The physical constraints may identify the order, number, spacing, etc. that is associated with a particular sequence. The machine learned gesture model can be implemented in one or more of the internal electronics module, the removable electronics module, and/or one or more remote computing devices.

In accordance with some implementations, touch data indicative of the touch input and/or one or more touch features associated with the touch input can be input into the machine learned gesture model. In response, the machine learned gesture model can be configured to output data indicative of an inference or detection of a gesture based on a similarity between the touch data indicative of the touch input and one or more of the sequences stored in the reference database.

The interactive object and/or a computing device in communication with the interactive object can initiate one or more actions based on a detected gesture. For example, a detected gesture can be associated with a navigation command (e.g., scrolling up/down/side, flipping a page, etc.) in one or more user interfaces coupled to the interactive object (e.g., via the capacitive touch sensor, the controller, or both) and/or any of the one or more remote computing devices. In addition, or alternatively, the respective gesture can initiate one or more predefined actions utilizing one or more computing devices, such as, for example, dialing a number, sending a text message, playing a sound recording etc.

Embodiments of the disclosed technology provide a number of technical effects and benefits, particularly in the areas of computing technology, textiles, and the integration of the two. In particular, embodiments of the disclosed technology provide improved techniques for detecting user gestures (e.g., in multiple dimensions). For example, utilizing embodiments of the disclosed technology, computing devices can detect user gestures in multiple dimensions with a one dimensional capacitive touch sensor. To do so, embodiments of the disclosed technology allow a capacitive touch sensor to define a plurality of sequences via two or more non-crossing conductive lines, each sequence corresponding to at least one user gesture. In this way, the capacitive touch sensor can define multiple sequences of lines in at least two dimensions; thereby, allowing a computing device to distinguish between two dimensional user gestures based on the line sequence. Moreover, embodiments of the disclosed technology, can detect multi-dimensional movements without relying on an intersection of crossing conductive threads. This, in turn, can reduce hardware requirements by reducing the number of conductive threads required to detect motion over the capacitive touch sensor. The capacitive touch sensor can thus be formed more efficiently and with fewer conductive threads.

Moreover, embodiments of the disclosed technology may enable capacitive touch sensors to be formed with less insulation relative to traditional sensors that utilize conductive lines. For example, conductive lines are often provided with insulation to avoid direct contact between lines. In grid-based designs where lines directly cross, ensuring adequate insulation can be challenging and may lead to increased use of insulating materials. Embodiments of the disclosed technology provide a simplified architecture while maintaining the ability to detect gestures based on different input directions. The challenges associated with insulating conductive lines from one another may be reduced by using a non-grid-based architecture according to example embodiments. In this manner, the capacitive touch sensor can be formed more efficiently, and may require less space than previous capacitive touch sensors based on insulated conductive wiring or layered capacitive touch sensors.

Example aspects of the disclosed technology provide an improvement to textile computing technology, such as capacitive touch sensors based on conductive lines. For instance, the systems and methods of the present disclosure provide an improved approach for detecting multi-dimensional user gestures based on one dimensional sensors. For example, a capacitive touch sensor can include two or more non-crossing conductive lines. The two or more non-crossing conductive lines can form a conductive line pattern at at least a first area of the capacitive touch sensor. The pattern can define at least a first line sequence, a second line sequence, and a third line sequence at the first area. The sequences may be defined relative to different input directions. The capacitive touch sensor can be coupled to one or more computing devices. The capacitive touch sensor can detect touch input based on a change in capacitance associated with the two or more non-crossing conductive lines. The one or more computing devices and/or the capacitive touch sensor can identify at least one line sequence associated with at least one of the first line sequence, the second line sequence, or the third line sequence based on the touch input to the capacitive touch sensor. Based on the identification, the one or more computing devices and/or the capacitive touch sensor can determine a respective gesture corresponding to at least one of the first line sequence, the second line sequence, and/or the third line sequence. In this manner, example embodiments of the disclosed technology utilize a capacitive touch sensor that provides a plurality of technical improvements over previous capacitive touch sensors. For instance, the capacitive touch sensor can detect multi-dimensional user gestures with non-crossing conductive lines by defining one or more unique sequences corresponding to a user gesture. By employing non-crossing lines, the capacitive touch sensor avoids problems inherent in crossing lines. In addition, the capacitive touch sensor may reduce computing resources by requiring less conductive lines to detect multi-dimensional user gestures. This, in turn, can lower the cost and increase the efficiency of producing effective capacitive touch sensors based on conductive lines. Ultimately, embodiments of the disclosed technology provide a practical application that provides a meaningful improvement to the manufacture and efficiency of capacitive touch sensors based on conductive lines.

FIG. 1 is an illustration of an example environment 100 in which an interactive object including capacitive touch sensor 102 including two or more non-crossing conductive lines formed in a conductive line pattern can be implemented. Environment 100 includes a capacitive touch sensor 102, which is shown as being integrated within various interactive objects 104. Capacitive touch sensor 102 can be a textile that is configured to sense touch input (e.g., multi-touch input). As described herein, a textile may include any type of flexible woven material consisting of a network of natural or artificial lines, often referred to as thread or yarn. Textiles may be formed by weaving, knitting, crocheting, knotting, pressing threads together or consolidating lines or filaments together in a nonwoven manner. In other examples, capacitive touch sensor 102 may not be a textile. For example, conductive lines can include a conductive film, wire or a plurality of conductive filaments. The lines may or may not be twisted, braided, or wrapped with a flexible thread. In some examples, conductive lines can be affixed to non-conductive threads or an interactive object using glue, tape, or thread using other sewing techniques.

In environment 100, interactive objects 104 include "flexible" objects, such as a shirt 104-1, a hat 104-2, a handbag 104-3 and a shoe 104-6. It is to be noted, however, that capacitive touch sensor 102 may be integrated within any type of flexible object made from fabric or a similar flexible material, such as garments or articles of clothing, garment accessories, garment containers, blankets, shower curtains, towels, sheets, bed spreads, or fabric casings of furniture, to name just a few. Examples of garment accessories may include sweat-wicking elastic bands to be worn around the head, wrist, or bicep. Other examples of garment accessories may be found in various wrist, arm, shoulder, knee, leg, and hip braces or compression sleeves. Headwear is another example of a garment accessory, e.g. sun visors, caps, and thermal balaclavas. Examples of garment containers may include waist or hip pouches, backpacks, handbags, satchels, hanging garment bags, and totes. Garment containers may be worn or carried by a user, as in the case of a backpack, or may hold their own weight, as in rolling luggage. Capacitive touch sensor 102 may be integrated within flexible objects 104 in a variety of different ways, including weaving, sewing, gluing, and so forth.

In this example, objects 104 further include "hard" objects, such as a plastic cup 104-4 and a hard smart phone casing 104-5. It is to be noted, however, that hard objects 104 may include any type of "hard" or "rigid" object made from non-flexible or semi-flexible materials, such as plastic, metal, aluminum, and so on. For example, hard objects 104 may also include plastic chairs, water bottles, plastic balls, or car parts, to name just a few. In another example, hard objects 104 may also include garment accessories such as chest plates, helmets, goggles, shin guards, and elbow guards. Alternatively, the hard or semi-flexible garment accessory may be embodied by a shoe, cleat, boot, or sandal. Capacitive touch sensor 102 may be integrated within hard objects 104 using a variety of different manufacturing processes. In one or more implementations, injection molding is used to integrate capacitive touch sensor 102 into hard objects 104.

Capacitive touch sensor 102 enables a user to control object 104 that the capacitive touch sensor 102 is integrated with, or to control a variety of other computing devices 106 via a network 108. Computing devices 106 are illustrated with various non-limiting example devices: server 106-1, smart phone 106-2, laptop 106-3, computing spectacles 106-4, television 106-5, camera 106-6, tablet 106-7, desktop 106-8, and smart watch 106-9, though other devices may also be used, such as home automation and control systems, sound or entertainment systems, home appliances, security systems, netbooks, and e-readers. Note that computing device 106 can be wearable (e.g., computing spectacles and smart watches), non-wearable but mobile (e.g., laptops and tablets), or relatively immobile (e.g., desktops and servers).

Network 108 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

Capacitive touch sensor 102 can interact with computing devices 106 by transmitting touch data or other sensor data through network 108. Computing device(s) 106 uses the touch data to control computing device(s) 106 or applications at computing device(s) 106. As an example, consider that capacitive touch sensor 102 integrated at shirt 104-1 may be configured to control the user's smart phone 106-2 in the user's pocket, television 106-5 in the user's home, smart watch 106-9 on the user's wrist, or various other appliances in the user's house, such as thermostats, lights, music, and so forth. For example, the user may be able to swipe up or down on capacitive touch sensor 102 integrated within the user's shirt 104-1 to cause the volume on television 106-5 to go up or down, to cause the temperature controlled by a thermostat in the user's house to increase or decrease, or to turn on and off lights in the user's house. Note that any type of touch, tap, swipe, hold, or stroke gesture may be recognized by capacitive touch sensor 102.

Figure 2:
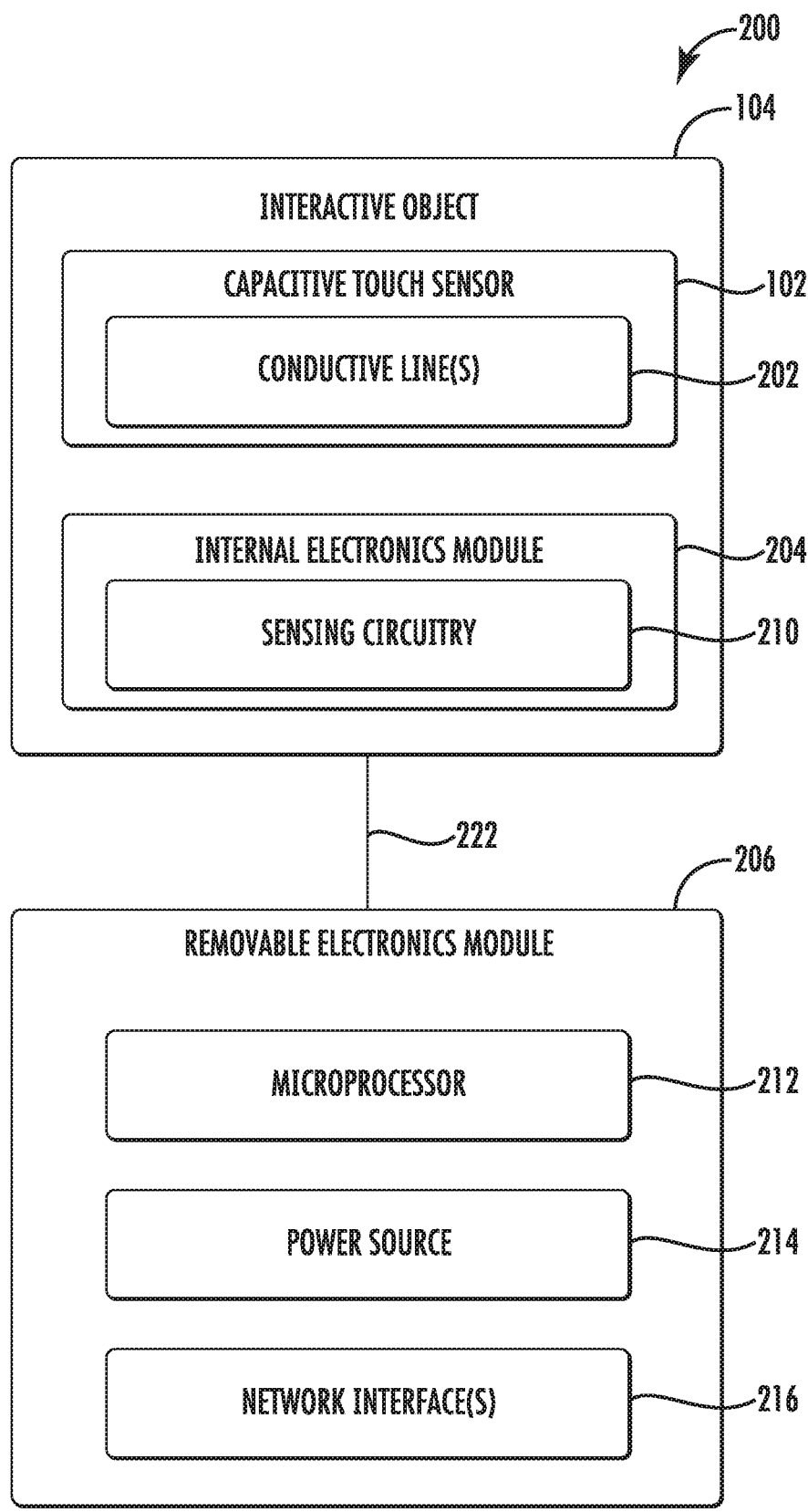
FIG. 2 depicts a block diagram of an example system that includes an interactive object and a removable electronics module in accordance with example embodiments of the present disclosure.

In more detail, consider FIG. 2 which illustrates an example system 200 that includes an interactive object 104 and multiple electronics modules. In system 200, capacitive touch sensor 102 is integrated in an interactive object 104, which may be implemented as a flexible object (e.g., shirt 104-1, hat 104-2, or handbag 104-3) or a hard object (e.g., plastic cup 104-4 or smart phone casing 104-5).

Capacitive touch sensor 102 is configured to sense touch input from a user when one or more fingers of the user's hand touch capacitive touch sensor 102. Capacitive touch sensor 102 may be configured to sense single-touch, multi-touch, and/or full-hand touch input from a user. To enable the detection of touch input, capacitive touch sensor 102 includes conductive line(s) 202, which as described hereinafter, can be coupled to capacitive touch sensor 102 (e.g., in a serpentine pattern, ellipse pattern, etc.) so as to define one or more sequences of lines relative to one or more respective input directions without crossing one another. Notably, conductive line(s) 202 do not alter the flexibility of capacitive touch sensor 102 in example embodiments, which enables capacitive touch sensor 102 to be easily integrated within flexible interactive objects 104.

Interactive object 104 can include an internal electronics module 204 that is embedded into interactive object 104 (e.g., garment, garment accessory, plastic cup, etc.). Internal electronics module 204 can be directly coupled to conductive line(s) 202 in some implementations. In other implementations, conductive lines 202 can be attached to internal electronics module 204 via one or more connector components. Internal electronics module 204 can be communicatively coupled to a removable electronics module 206 via a communication interface 222. Internal electronics module 204 contains a first subset of electronic components for the interactive object 104, and removable electronics module 206 contains a second, different, subset of electronics components for the interactive object 104. As described herein, the internal electronics module 204 may be physically and permanently embedded within interactive object 104, whereas the removable electronics module 206 may be removably coupled to interactive object 104.

Internal electronics module 204 can include electronic components, such as sensing circuitry 210 configured to detect touch input to conductive line(s) 202. For example, the sensing circuitry 210 can be coupled to conductive line(s) 202 that can be woven into capacitive touch sensor 102. For example, wires from the conductive lines 202 may be connected to sensing circuitry 210 using flexible PCB, creping, gluing with conductive glue, soldering, and so forth. In one embodiment, the sensing circuitry 210 can be configured to detect a user-inputted touch input on capacitive touch sensor 102 that is pre-programmed to indicate a certain request. In one embodiment, when conductive line(s) 202 form a conductive line pattern (e.g., a snake, partial ellipse or other pattern), sensing circuitry 210 can be configured to also detect an input direction of the touch input on conductive line(s) 202. For example, when an object, such as a user's finger, stylus, etc., touches conductive line(s) 202, the direction of the touch can be determined by sensing circuitry 210 by detecting a change in capacitance on the conductive line pattern of capacitive touch sensor 102. The touch input may then be used to generate touch data usable to control computing device(s) 106. For example, the touch input can be used to determine various gestures, such as single-finger and multi-finger swipes (e.g., swipe up, swipe down, swipe left, swipe right).

Internal electronics module 204 can include one or more drivers and can provide power and/or control signals to conductive line(s) 202. The internal electronics module 204 may not include an on-board power source in some embodiments. Instead, a removable electronics module 206 can supply power to internal electronics module 204. Sensing circuitry 210 in some examples includes a controller that is configured to detect a touch input, for example, when user pressure is applied to conductive line(s) 202. The internal electronics module 204 can be configured to communicate touch data indicative of the touch input to a computing device such as removable electronics module 206 or one or more remote computing devices. In some examples, the controller comprises a flexible printed circuit board (PCB) including a microprocessor. The printed circuit board can include a set of contact pads for attaching to conductive line(s) 202.

Communication interface 222 enables the transfer of power and data (e.g., touch data indicative of touch input) between internal electronics module 204 and removable electronics module 206. In some implementations, communication interface 222 may be implemented as a connector that includes a connector plug and a connector receptacle. The connector plug may be implemented at removable electronics module 206 and is configured to connect to the connector receptacle, which may be implemented at the interactive object 104.

In some embodiments, removable electronics module 206 includes a second subset of electronic components (e.g., a microprocessor 212, power source 214, or network interface 216). Removable electronics module 206 can be removably coupled to the interactive object 104 via the communication interface 222. The communication interface 222 enables communication between internal electronics module 204 and removable electronics module 206 when removable electronics module 206 is coupled to interactive object 104. In example embodiments, removable electronics module 206 can be removably mounted to a rigid member on interactive object 104. A connector can include a connecting device for physically and electrically coupling to removable electronics module 206. Internal electronics module 204 can be in communication with the connector. Internal electronics module 204 can be configured to communicate with removable electronics module 206 when connected to the connector. A controller of removable electronics module 206 can receive information and send commands to internal electronics module 204. A communication interface 222 is configured to enable communication between internal electronics module 204 and the controller when the connector is coupled to removable electronics module 206. For example, communication interface 222 may comprise a network interface 216 integral with removable electronics module 206. Removable electronics module 206 can also include a rechargeable power source 214. Removable electronics module 206 can be removable from interactive object 104 for charging power source 214. Once power source 214 is charged, removable electronics module 206 can be placed back into interactive object 104 and electrically coupled to the connector.

Power source 214 may be coupled, via communication interface 222, to sensing circuitry 210 to provide power to sensing circuitry 210 to enable the detection of touch input. In one or more embodiments, communication interface 222 is implemented as a connector that is configured to connect removable electronics module 206 to internal electronics module 204 of interactive object 104. When touch input is detected by sensing circuitry 210 of internal electronics module 204, data representative of the touch input may be communicated, via communication interface 222, to microprocessor 212 of removable electronics module 206. Microprocessor 212 may then analyze the touch data to generate one or more control signals, which may then be communicated to computing device 106 (e.g., a smart phone) via network interface 216 to cause computing device 106 to initiate a particular functionality. Generally, network interfaces 216 are configured to communicate data, such as touch data, over wired, wireless, or optical networks to computing devices 106. By way of example and not limitation, network interfaces 216 may communicate data over a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like (e.g., through network 108 of FIG. 1).

While internal electronics module 204 and removable electronics module 206 are illustrated and described as including specific electronic components, it is to be appreciated that these modules may be configured in a variety of different ways. For example, in some cases, electronic components described as being contained within internal electronics module 204 may be at least partially implemented at removable electronics module 206, and vice versa. Furthermore, internal electronics module 204 and removable electronics module 206 may include electronic components other that those illustrated in FIG. 2, such as sensors, light sources (e.g., LED's), displays, speakers, and so forth.

Figure 3:
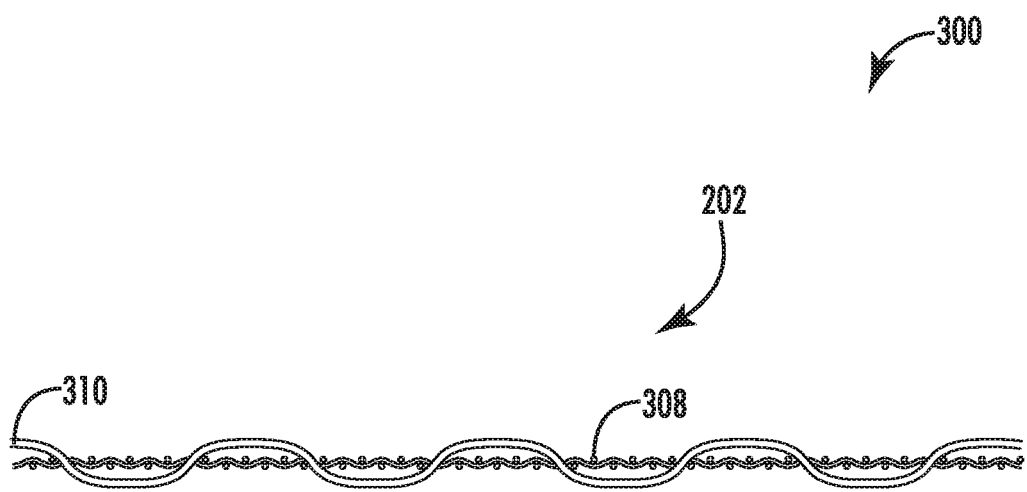
FIG. 3 depicts an example of a conductive line integrated with an interactive textile in accordance with example embodiments of the present disclosure.

Conductive line 202 can include a conductive thread, conductive fiber, conductive filament, fiber optic filaments, flexible metal lines, etc. FIG. 3 depicts an example 300 of a conductive line 202 implemented as a conductive thread in accordance with example embodiments of the present disclosure. The conductive thread includes a conductive wire 310 that is combined with one or more flexible threads 308. Conductive wire 310 may be combined with flexible threads 308 in a variety of different ways, such as by twisting flexible threads 308 with conductive wire 310, wrapping flexible threads 308 with conductive wire 310, braiding or weaving flexible threads 308 to form a cover that covers conductive wire 310, and so forth. Twisting conductive wire 310 with flexible thread 308 causes conductive thread 202 to be flexible and stretchy, which enables conductive thread 202 to be easily woven with non-conductive threads to form an interactive fabric, or embroidered onto interactive fabric. Conductive wire 310 may be implemented using a variety of different conductive materials, such as copper, silver, gold, aluminum, or other materials coated with a conductive polymer. Flexible thread 308 may be implemented as any type of flexible thread or fiber, such as cotton, wool, silk, nylon, polyester, and so forth.

Combining conductive wire 310 with flexible thread 308 causes conductive line 202 to be flexible and stretchy, which enables conductive line 202 to be easily woven with one or more non-conductive lines (e.g., cotton, silk, or polyester). In one or more implementations, conductive line 202 includes a conductive core that includes at least one conductive wire 310 (e.g., one or more copper wires) and a cover layer, configured to cover the conductive core, that is constructed from flexible threads 308. In some cases, conductive wire 310 of the conductive core is insulated. Alternately, conductive wire 310 of the conductive core is not insulated.

A conductive core can include at least one conductive wire and a cover layer constructed from flexible threads that cover the conductive core. The conductive core may be formed by twisting one or more flexible threads (e.g., silk threads, polyester threads, or cotton threads) with the conductive wire, or by wrapping flexible threads around the conductive wire. In some embodiments, the conductive core may be formed by braiding the conductive wire with flexible threads (e.g., silk). The cover layer may be formed by wrapping or braiding flexible threads around the conductive core. In some embodiments, the conductive thread is implemented with a "double-braided" structure in which the conductive core is formed by braiding flexible threads with a conductive wire, and then braiding flexible threads around the braided conductive core. Although many examples are provided with respect to conductive threads, it will be appreciated that any type of conductive line can be used with the capacitive touch sensor 102 according to example embodiments. For example, a conductive line can be used to transmit and/or emit light, such as in line optic applications.

Conductive line(s) 202 can be integrated with non-conductive threads to form a fabric or a textile. For example, conductive line can be sewn onto the interactive textile or may be woven with the non-conductive threads. In other examples, conductive line(s) 202 can be affixed to the non-conductive threads, another substrate, and/or another surface of interactive object 104 using glue, tape, or thread etc. It will be appreciated that non-conductive threads are not necessary for integrating conductive line(s) 202 with an interactive object 104.

Interactive object 104 can include capacitive touch sensor 102 with two or more non-crossing conductive lines configured to receive touch input from one or more users. The two or more non-crossing lines forming capacitive touch sensor 102 can form at least a first conductive line pattern at an area of capacitive touch sensor 102. The first conductive line pattern can include any suitable pattern of non-crossing conductive lines 202 that are formed in a non-crossing manner. In particular, consider FIG. 4 which depicts an example 400 of a capacitive touch sensor 102 including non-crossing conductive lines 202(*a-e*) configured to detect gestures in multiple input directions in accordance with example embodiments of the present disclosure. The individual lines at a first area 420 where a first conductive line pattern 410 is formed do not overlap or otherwise cross one another. For example, the non-crossing individual lines 202(*a-e*) of the conductive line pattern 410 do not cross underneath or over one another at the first area 420 of capacitive touch sensor 102. Moreover, the non-crossing individual lines 202(*a-e*) of the conductive line pattern 410 do not otherwise touch each other at the first area 420 of the capacitive touch sensor 102. Thus, the non-crossing manner of the conductive line pattern 410 provides that each individual line 202(*a-e*) does not cross underneath, over, or otherwise touch one another at the first area 420 of the capacitive touch sensor 102.

Capacitive touch sensor 102 can be formed with a simplified architecture while enabling the detection of inputs in multiple directions. By including a capacitive touch sensor 102 with two or more non-crossing lines 202(*a-e*), example embodiments in accordance with the present disclosure can provide a simplified sensor architecture capable of multi-dimensional input detection that typically requires more complex architectures. As described in detail below, FIG. 4 depicts just one of various approaches for forming a capacitive touch sensor that includes non-crossing conductive lines capable of multi-dimensional input detection in accordance with example embodiments as described.

Figure 4:
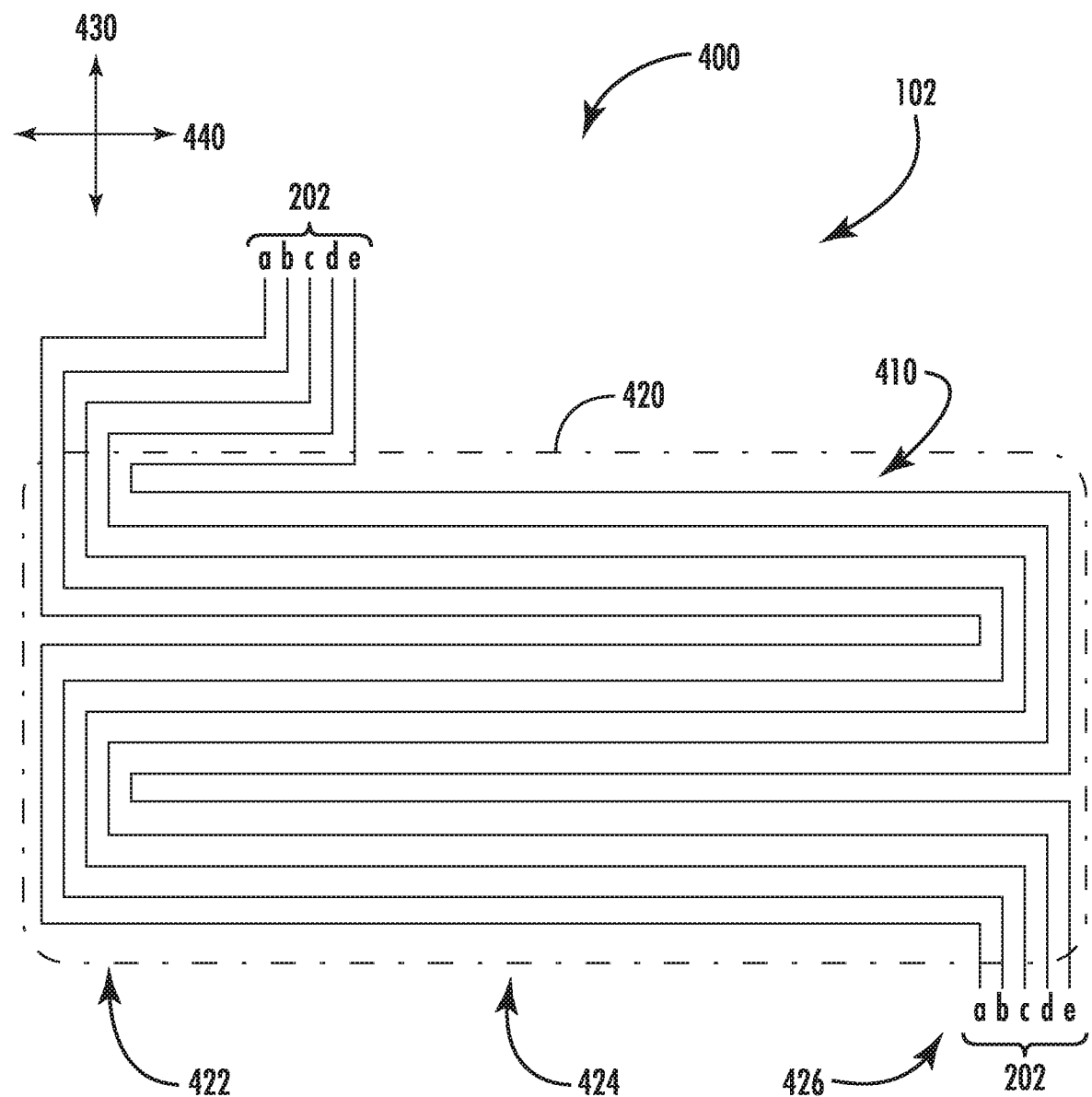
FIG. 4 depicts an example of a conductive line pattern including non-crossing conductive lines in accordance with example embodiments of the present disclosure.

FIG. 4 depicts a conductive line pattern 410 defined by non-crossing conductive lines 202(*a-e*). In this example, non-crossing conductive lines 202(*a-e*) form a serpentine pattern at a first area 420 of the capacitive touch sensor 102. By way of example, non-crossing conductive lines 202(*a-e*) are parallel to one another and extend along the longitudinal axis 430 at a first portion 422 of capacitive touch sensor 102. Non-crossing conductive lines 202(*a-e*) are parallel to one another and extend along lateral axis 440 at a second portion 424 of capacitive touch sensor 102. Each non-crossing conductive line is formed continuously from the first portion 422 to the second portion 424. Non-crossing conductive lines 202(*a-e*) are parallel to one another and extend along the longitudinal axis 430 at a third portion 426 of the capacitive touch sensor 102. Each non-crossing conductive line is formed continuously from the second portion 424 to the third portion 426. In some examples, conductive lines 202(a-e) may be insulated from touch input at areas outside of area 420. For instance, a capacitive shielding layer may be formed over or otherwise cover conductive lines 202(a-e) outside of area 420.

Figure 5:
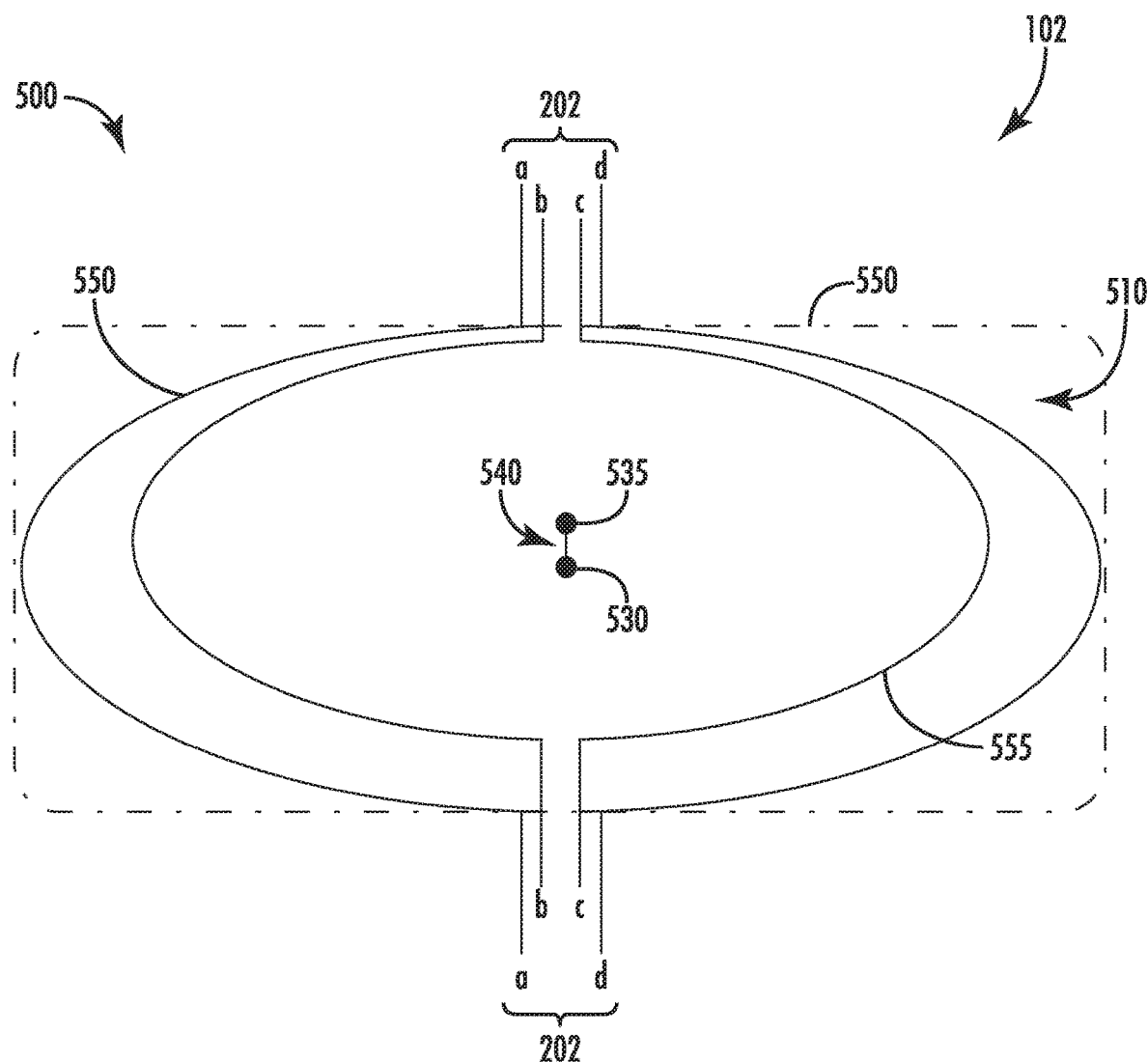
FIG. 5 depicts another example of a conductive line pattern including non-crossing conductive lines in accordance with example embodiments of the present disclosure.

FIG. 5 depicts another example 500 of a conductive line pattern including non-crossing conductive lines in accordance with example embodiments of the present disclosure. Conductive line pattern 510 includes a series of partial ellipses 550/555 defined by non-crossing conductive lines 202(a-d). Non-crossing conductive lines 202(a-d) define at least one partial outer ellipse 550 and at least one partial inner ellipse 555 without crossing. Partial inner ellipse 555 extends within partial outer ellipse 550. Partial inner ellipse 555 extends uniformly off center from partial outer ellipse 550. The center point of partial inner ellipse 535 is different than the center point of partial outer ellipse 530. In particular, the center point 535 of partial inner ellipse 555 is separated from the center point 530 of partial outer ellipse 550 by a distance 540. In this manner, as described in further detail below with reference to FIG. 8, the space between each of non-crossing conductive lines 202(a-d) can be made to vary depending on a direction across conductive line pattern 510. In other examples, a conductive line pattern may include partial ellipses that are not off-center relative to one another.

As noted above, various other conductive line patterns including non-crossing conductive lines can be used in accordance with the present disclosure to detect gestures in multiple crossing directions. Two or more non-crossing conductive lines can be configured in any conductive line pattern in any area of the capacitive touch sensor.

FIG. 6 depicts an example capacitive touch sensor 102 including non-crossing conductive lines 202(a-e). Conductive line pattern 410 defines multiple line sequences 602-608 relative to a longitudinal axis 430 and a lateral axis 440. A first line sequence 602 is defined relative to a first input direction 610 along the lateral axis 440 and a second line sequence 604 is defined relative to a second input direction 615 along the lateral axis 440. The first input direction 610 and the second input direction 615 are opposite directions along lateral axis 440. At area 420, non-crossing conductive lines 202(a-e) also define a third line sequence 606 relative to a third input direction 620 along the longitudinal axis 430 and a fourth line sequence 608 relative to a fourth input direction 625 along the longitudinal axis 430. The third input direction 620 and the fourth input direction 625 are opposite directions along longitudinal axis 430. Moreover, third input direction 620 and fourth input direction 625 are orthogonal to first input direction 610 and second input direction 615. It is noted that an input direction may be a component of a motion that includes multiple directional components that comprise a touch input. For example, first input direction 610 may be one directional component of a touch input that has multiple directional components, such as a directional component in a direction along the longitudinal axis.

A touch input applied at the area 420 of the capacitive touch sensor 102 can generate touch data that can be used to discriminate multiple gestures provided in different dimensions. For example, swipe inputs across the conductive line pattern 410 having opposite first and second directional components can be identified. The first directional component can correspond to the first input direction 610 and can generally be right to left along the lateral axis 440. The second directional component can correspond to the second input direction 615 and can generally be left to right along the lateral axis 440. Additionally, swipe inputs across the conductive line pattern 410 in opposite third and fourth directions can be identified. The third and fourth directional components can be orthogonal to the first and second directional components. For example, the third directional component can correspond to the third input direction 620 and can be generally downward along the longitudinal axis 430, while the fourth directional component can correspond to the fourth input direction 625 and can be generally upward along the longitudinal axis 430. A capacitive touch sensor 102 in accordance with example embodiments may be able to identify fewer or additional gestures than those described.

Each line sequence includes one or more sequence features that can be utilized to detect one or more gestures. For example, the one or more features of a particular sequence can include a particular order of non-crossing conductive lines, a particular number of non-crossing conductive lines, one or more distances between two or more non-crossing conductive lines, etc. A particular order of non-crossing conductive lines can be defined for a set of non-crossing conductive lines forming capacitive touch sensor 102. The particular order of non-crossing conductive lines can be at a given portion of a conductive line pattern corresponding to a particular line sequence. Each line sequence can include an order of non-crossing conductive lines in a particular direction across the conductive line pattern.

The first line sequence 602 has an order:
202(e)-202(d)-202(c)-202(b)-202(a)-[202(a-e)]-202(e)-202(d)-202(c)-202(b)-202(a).
The sequence is relative to the first input direction 610. The first input direction 610 intersects, at least in part, the first line sequence 602. Conductive line pattern 410 also includes second line sequence 604. Second line sequence 604 has an order:
202(a)-202(b)-202(c)-202(d)-202(e)-[202(a-e)]-202(a)-202(b)-202(c)-202(d)-202(e).
Second line sequence 604 is relative to the second input direction 615. The second input direction 615 intersects, at least in part, second line sequence 604. A touch input across the conductive line pattern 410 that includes a directional component in the second input direction 615 will be detected as the second line sequence 604. In this example, the order of the second sequence 604 is opposite to the order of the first sequence 602. However, the order of each sequence can be distinct in other ways.

In this example, the first input direction 610 and the second input direction 615 are opposite directions along lateral axis 440. The first line sequence 602 and the second line sequence 604 include an order of lines along the lateral axis 440 of conductive line pattern 410. Conductive line pattern 410 defines a first line sequence 602 relative to first input direction 610 in a first lateral direction along capacitive touch sensor 102. In addition, conductive line pattern 410 defines a second line sequence 604 relative to second input direction 615 in a second lateral direction (e.g., opposite to the first lateral direction) along capacitive touch sensor 102. In this manner, conductive line pattern 410 defines at least one line sequence relative to each direction in a first (e.g., lateral) dimension 440. The first line sequence 602 and the second line sequence 604 can be associated with a respective gesture. For example, the first line sequence 602 can be associated with a swipe input across the conductive line pattern 410, where the swipe input has a directional component in a first lateral direction along the lateral axis 440 of conductive line pattern 410. In addition, or alternatively, the second line sequence 604 can be associated with a swipe input across the conductive line pattern 410, where the swipe input has a directional component in a second, opposite lateral direction along the lateral axis 440 of conductive line pattern 410.

In addition, conductive line pattern 410 includes a third line sequence 606. The third line sequence 606 has an order:

202(*e*)-202(*d*)-202(*c*)-202(*b*)-202(*a*)-202(*a*)-202(*b*)-202(*c*)-202(*d*)-202(*e*)-202(*e*)-202(*d*)-202(*c*)-202(*b*)-202(*a*).

Third line sequence 606 is relative to the third input direction 620. The third input direction 620 intersects, at least in part, the third line sequence 606. A touch input across the pattern 410 that includes a directional component in the third input direction 620 will be detected as the third line sequence 606. Conductive line pattern 410 also includes a fourth line sequence 608. The fourth line sequence 608 has an order:

202(*a*)-202(*b*)-202(*c*)-202(*d*)-202(*e*)-202(*e*)-202(*d*)-202(*c*)-202(*b*)-202(*a*)-202(*a*)-202(*b*)-202(*c*)-202(*d*)-202(*e*).

Fourth line sequence 608 is relative to the fourth input direction 625. Non-crossing conductive lines 202(*a-e*) extend in a direction orthogonal to fourth input direction 625. In this manner, the fourth input direction 625 intersects, at least in part, fourth line sequence 608. A touch input across the pattern 410 that includes a directional component in the fourth input direction 625 will be detected as the fourth line sequence 608. In this example, the order of the fourth sequence 608 is opposite to the order of the third sequence 606.

Third input direction 620 and fourth input direction 625 are opposite directions along longitudinal axis 430. Third line sequence 606 and fourth line sequence 608 each include a line sequence along the longitudinal axis 430 of conductive line pattern 410. Third input direction 620 (e.g., a longitudinal direction) is orthogonal to first input direction 610 and second input direction 615 (e.g., lateral directions). In this manner, conductive line pattern 410 defines at least one line sequence relative to opposite directions along a second longitudinal axis 430. The third line sequence 606 and the fourth line sequence 608 can be associated with a respective gesture. For example, the third line sequence 606 can be associated with a swipe input across the conductive line pattern 410, where the swipe input has a directional component in a first longitudinal direction along the longitudinal axis 430 of conductive line pattern 410. In addition, or alternatively, the fourth line sequence 608 can be associated with a swipe input across the conductive line pattern 410, where the swipe input has a directional component in a second, opposite direction along the longitudinal axis 430 of the conductive line pattern 410.

In this example, each line sequence defined by conductive line pattern 410 includes a distinct order of lines. As discussed in more detail below, the distinct order of lines associated with each line sequence can be used to identify a particular line sequence in a conductive line pattern. A particular line sequence can be identified by only a portion of a conductive line pattern and/or only a portion of capacitive touch sensor 102. Although four line sequences are illustrated in FIG. 6, it is to be noted that a conductive line pattern can define any number of line sequences in any number of portions of a capacitive touch sensor 102. For example, conductive line pattern 410 can define a plurality of line sequences in addition to the line sequences 602-608. By way of example, conductive line pattern 410 can define at least a fifth and/or a sixth line sequence. For example, conductive line pattern 410 can define a fifth line sequence relative to a fifth input direction. The fifth input direction can include a direction in between the first and third input directions 610/620 (e.g., in a diagonal direction). In addition, or alternatively, conductive line pattern 410 can define a sixth line sequence relative to a sixth input direction. The sixth input direction can include an opposite direction along a common axis of the fifth input direction. In this manner, a capacitive touch sensor 102 in accordance with example embodiments may be able to identify fewer or additional gestures than those described.

Although not illustrated in FIG. 6, the one or more features for a particular line sequence can include one or more distances associated with a conductive line pattern. For example, as discussed in further detail with reference to FIG. 8, the one or more distances can include a spacing between two or more non-crossing conductive lines at a given portion of the conductive line pattern corresponding to one or more line sequences. For example, the conductive line pattern can include different distances between non-crossing conductive lines at portions of the capacitive touch sensor 102 corresponding to one or more different conductive line sequences. By way of example, a first portion of the conductive line pattern can have different spacing between non-crossing conductive lines than a second portion of the conductive line pattern. For instance, the non-crossing conductive lines forming the first portion of the conductive line pattern can be spaced apart a first distance and the conductive lines forming the second portion of the conductive line pattern can be spaced apart a second distance. In an example embodiment, each line sequence can include at least two non-crossing conductive lines and a distance between the two or more non-crossing conductive lines. By way of example, line sequences can include different distances depending on the input direction across the capacitive touch sensor 102. In addition, or alternatively, each line sequence can include a particular order of two or more non-crossing conductive lines and/or a particular spacing between each of the two or more non-crossing conductive lines in the particular order.

In addition, or alternatively, the one or more features for a particular line sequence can include a particular number of non-crossing conductive lines in the set of non-crossing conductive lines forming the conductive line pattern. For instance, the sequence features can include a particular number of non-crossing conductive lines at a given portion of the conductive line pattern corresponding to the particular line sequence. By way of example, the conductive line pattern can include a different number of non-crossing conductive lines in one or more portions of the capacitive touch sensor 102. For example, each line sequence can include a different number of non-crossing conductive lines in the set of non-crossing conductive lines forming the conductive line pattern. For instance, in an example embodiment, each line sequence can include a particular number of conductive lines, a particular order of the particular number of conductive lines, and a spacing between each of the number of conductive lines. The sequence features associated with each line sequence can be used to identify a gesture based on touch input applied to capacitive touch sensor 102.

FIG. 7a depicts an example 700 of a touch input 750 applied to a capacitive touch sensor 102 in accordance with an example embodiment. Touch input 750 may be interpreted by the touch sensor 102 as a pre-defined gesture. For example, touch input 750 may be interpreted as a horizontal swipe gesture in the L to R direction. In example 700, touch input 750 includes a directional component along the lateral axis 440 across the capacitive touch sensor 102. The touch input 750 is sensed by contact or proximity of finger 760 to non-crossing conductive lines 202(a-e) at conductive line pattern 410. For example, the touch input 750 may be detected as the second line sequence 604 shown in FIG. 6. In accordance with embodiments of the present disclosure, this second line sequence 604 can be associated with a particular gesture. In this manner, interactive object 104 can determine that a horizontal swipe gesture is performed in response to detecting lateral movement having a directional component 615 as shown in FIG. 6. It is noted that the size of capacitive touch sensor 102 relative to finger 760 can vary. For example, a stylus having a much smaller tip than finger 760 may provide a touch input 750 that will also be detected as the second line sequence 604.

FIG. 7b depicts an example touch input 755 applied to a capacitive touch sensor 102 in accordance with an example embodiment. Touch input 755 can be interpreted as the same input gesture detected in response to the touch input 750 illustrated in FIG. 7A in some examples. For example, touch input 755 may be detected as a line sequence that shares many, but perhaps not all of the exact features as line sequence 604. Nevertheless, interactive object 104 can identify line sequence 604 from touch input 755. In response to touch input 755, the system can determine that a horizontal swipe gesture in the L to R direction was performed.

FIG. 8 depicts another example 800 of a capacitive touch sensor 102 including non-crossing conductive lines 202(a-d) forming conductive line pattern 510 configured to detect gestures in multiple input directions in accordance with example embodiments of the present disclosure. FIG. 8 includes an example capacitive touch sensor 102 including non-crossing conductive lines 202(a-d). Conductive line pattern 510 defines multiple line sequences 802-808 relative to a longitudinal axis 430 and a lateral axis 440. A first line sequence 802 is defined relative to a first input direction 610 along the lateral axis 440 and a second line sequence 804 is defined relative to a second input direction 615 along the lateral axis 440. The first input direction 610 and the second input direction 615 are opposite directions along the lateral axis 440. At area 520, non-crossing conductive lines 202(a-d) also define a third line sequence 806 relative to a third input direction 620 along the longitudinal axis 430 and a fourth line sequence 808 relative to a fourth input direction 625 along the longitudinal axis 430. Each line sequence 802-808 includes one or more distinct sequence features including a distinct order of conductive lines and/or a distinct spacing between conductive lines.

In particular, conductive line pattern 510 defines a first line sequence 802 including an order: 202(d)-202(c)-202(b)-202(a) relative to the first input direction 610. Conductive line pattern 510 defines a second line sequence 804 including a different order: 202(a)-202(b)-202(c)-202(d) relative to the second input direction 615. In addition, conductive line pattern 510 defines a third line sequence 806 including a different order: 202(d)-202(c)-202(c)-202(d) along the third input direction 620. Conductive line pattern 510 also includes a fourth line sequence 808 including an order: 202(d)-202(c)-202(c)-202(d). The fourth line sequence 808 includes the same order of non-crossing conductive lines 202(a-d) as the third line sequence 806. However, the spacing between each conductive line in the order of non-crossing conductive lines 202(a-d) is different. In particular, the fourth line sequence 808 includes a first spacing 810 between non-crossing conductive lines 202(d)-202(c). The third line sequence 806, on the other hand, includes a second spacing 820 between non-crossing conductive lines 202(d)-202(c).

In this manner, each line sequence defined by conductive line pattern 510 includes at least a distinct order and/or spacing between non-crossing conductive lines 202(a-d). As discussed in more detail below, the distinct order and spacing between conductive lines associated with each line sequence can be used to identify a particular line sequence in a conductive line pattern. Each distinct order and spacing of lines illustrated above is taken across a particular portion of conductive line pattern 510. However, a line sequence can be identified by any portion of a conductive line pattern and/or any portion of capacitive touch sensor 102.

Figure 9:
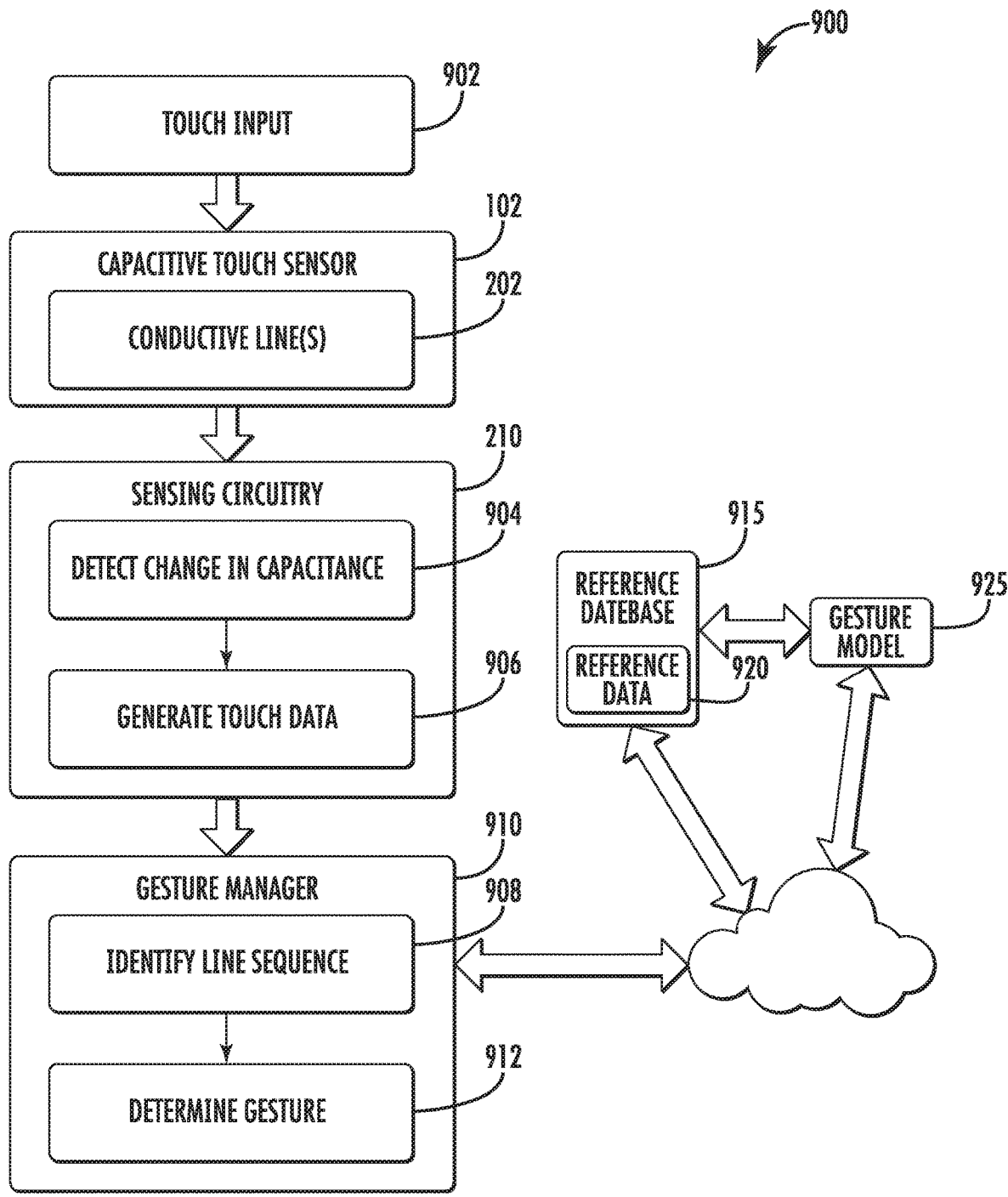
FIG. 9 depicts an example computing system configured to detect touch input to a capacitive touch sensor in accordance with example embodiments of the present disclosure.

Turning to FIG. 9, an example computing system configured to determine a gesture based on a detected touch input to capacitive touch sensor 102 in accordance with example embodiments of the present disclosure is illustrated. Interactive object 104 and/or one or more computing devices in communication with interactive object 104 can detect a user gesture based at least in part on capacitive touch sensor 102. For example, interactive object 104 and/or the one or more computing devices can implement a gesture manager 910 that can identify one or more gestures in response to touch input 902 to the capacitive touch sensor 102.

Interactive object 104 can detect touch input 902 to capacitive touch sensor 102 based on a change in capacitance associated non-crossing conductive lines 202. For example, a user can activate one or more non-crossing conductive lines 202 by moving an object (e.g., finger, conductive stylus, etc.) across capacitive touch sensor 102. By way of example, the capacitance associated with each of the non-crossing conductive lines 202 can change when touched by the object or when the object comes in proximity to the conductive line. As shown at (904), sensing circuitry 210 can detect a change in capacitance associated with one or more of the non-crossing conductive lines 202. Sensing circuitry 210 can generate touch data 906 indicative of the one or more activations (e.g., changes in capacitance) associated with one or more of the non-crossing conductive lines 202.

Sensing circuitry 210 of internal electronics module 204 can generate touch data in response to detecting the touch input 902, as illustrated at (906). The touch data can include data indicative of touch input 902. For example, the touch data can include one or more touch input features associated with touch input 902. In some examples, the touch data may identify a particular line that was touched, and a time associated with the touch to the line. By way of example, the one or more times corresponding to one or more of the non-crossing conductive lines 202 can include a time stamp and/or a time period associated with a change in capacitance of one or more of the non-crossing conductive lines 202. For example, the one or more times can correspond to one or more time periods in between a change in capacitance of two particular conductive lines.

Interactive object 104 (e.g., internal electronics module 204 and/or removable electronics module 206) and/or one or more computing devices in communication with interactive object 104 can analyze touch data to identify the one or more touch input features associated with touch input 902. The one or more touch input features can include, for example, an order of non-crossing conductive lines 202, a number of non-crossing conductive lines 202, and/or one or more times corresponding to one or more of the non-crossing conductive lines 202. For example, each of the one or more touch input features can correspond to a particular touch input 902 detected at a portion of capacitive touch sensor 102 at a particular time. Interactive object 104 (e.g., internal electronics module 204 and/or removable electronics module 206) and/or one or more computing devices in communication with interactive object 104 can include a gesture manager 910. Gesture manager 910 can be configured to analyze touch data to determine a respective line sequence and/or a respective gesture.

In particular at (908), gesture manager 910 can analyze touch data to identify a number of activated conductive lines, an order of activated conductive lines, and/or a distance between at least two of the activated conductive lines associated with the touch input 902. For example, gesture manager 910 can identify an order in which non-crossing conductive lines 202 are activated during touch input 902 to capacitive touch sensor 102. In addition, gesture manager 910 can identify one or more times corresponding to each activation of non-crossing conductive lines 202. The one or more times can correspond to a period of time in between an activation (e.g., change in capacitance) associated with at least two non-crossing conductive lines 202 during the touch input 902. Gesture manager 910 can determine a respective distance between the at least two of the non-crossing conductive lines 202 based on the respective period of time between each activation. For example, a period of time between the activation of at least two of the non-crossing conductive lines 202 can correspond to a respective distance between the at least two of the non-crossing conductive lines 202. In this manner, gesture manager 910 can determine a distance between at least two activated conductive lines based on the one or more times corresponding to one or more non-crossing conductive lines 202. Gesture manager 910 can identify at least one line sequence at (908) based at least in part on the number of activated conductive lines, an order of activated conductive lines, and/or a distance between at least two of the activated conductive lines associated with the touch input 902.

In some examples, gesture manager 910 can identify at least one line sequence based on reference data 920. Reference data 920 can include data indicative of one or more sequence features corresponding to at least one line sequence. The reference data 920 can be stored in a reference database 915 in association with one or more sequences of lines. In addition, or alternatively, reference database 915 can include data indicative of one or more gestures corresponding to each of the one or more line sequences. Reference database 915 can be stored on interactive object 104 (e.g., internal electronics module 204 and/or removable electronics module 206) and/or on one or more computing devices in communication with the interactive object 104. In addition, or alternatively, reference database 915 can be stored remote from interactive object 104 in one or more remote servers. In such a case, interactive object 104 can access remote database 915 via one or more communication interfaces (e.g., network interface 216).

Gesture manager 910 can compare the touch data indicative of the touch input 902 with reference data 920 corresponding to at least one line sequence. For example, gesture manager 910 can compare touch input features associated with touch input 902 to reference data 920 indicative of one or more sequence features. Gesture manager 910 can determine a correspondence between at least one touch input feature and at least one sequence feature. Gesture manager can detect a correspondence between touch input 902 and at least one line sequence in reference database 915 based on the determined correspondence between at least one touch input feature and at least one sequence feature.

For example, gesture manager 910 can detect a correspondence between touch input 902 and at least one of a first line sequence, a second line sequence, and/or a third line sequence. By way of example, gesture manager 910 can identify one or more corresponding features between the touch data indicative of touch input 902 and at least one of the first line sequence, the second line sequence, and/or the third line sequence. The corresponding features can include at least one touch input feature and at least one sequence feature from reference database 915 that meet a matching criteria. Gesture manager 910 can determine a similarity between the touch input 902 and a respective line sequence from reference database 915 based on the corresponding features. For example, the similarity between the touch input 902 and a respective line sequence can be determined based on a number of corresponding features identified between the touch input features associated with the touch input 902 and respective sequence features associated with a respective line sequence. For instance, gesture manager 910 can detect a correspondence between touch input 902 and a line sequence based on a respective line sequence associated with the largest number of corresponding features.

In addition, or alternatively, gesture manager 910 can detect a correspondence between touch input 902 and a line sequence based on one or more priority scores associated with each line sequence. For example, one or more sequence features in reference database 915 can be associated with a respective priority score. By way of example, a sequence feature can be assigned a priority score based on a level of distinctiveness. For instance, less common sequence features in reference database 915 can be assigned a higher priority score. For example, a first order of one or more non-crossing conductive lines across a first portion of a conductive line pattern can be associated with a higher priority score than a second order of one or more non-crossing conductive lines across a second portion of a conductive line pattern. By way of example, the first order can be associated with a higher priority score because it is associated with fewer line sequences than the second order. Moreover, a spacing between two non-crossing conductive lines distinct to a single line sequence can be assigned a higher priority than a spacing between two non-crossing conductive lines shared by a plurality line sequences. In this manner, sequence features can be weighted according to a level of distinctiveness. In example embodiments, gesture manager 910 can detect a correspondence between touch input 902 and a line sequence based on the respective line sequence associated with the highest priority score. For example, gesture manager 910 can aggregate the priority scores associated with each corresponding feature between touch input 902 and one or more line sequences in reference database 915. Gesture manager 910 can detect a correspondence between touch input 902 and the line sequence associated with the highest aggregated score.

Gesture manager 910 can determine a respective gesture at (912) based on touch input 902. For example, gesture manager 910 can determine a respective gesture corresponding to a line sequence identified in response to touch input 902. By way of example, an identifier for each line sequence can be stored in reference database 915 with an identification of a respective gesture. Gesture manager 910 can utilize reference database 915 to identify a respective gesture corresponding to a detected line sequence. For example, gesture manager 910 can determine a respective gesture 912 by identifying a respective gesture associated with the detected line sequence from reference database 915.

In addition, or alternatively, gesture manager 910 can input touch input 902 and/or the touch data indicative of touch input 902 into a machine learned gesture model 925. Machine-learned gesture model 925 can be configured to output a detection of at least one line sequence, or, alternatively, a gesture corresponding to the at least one line sequence. Machine learned gesture model 925 can generate data indicative of input features based on touch input 902 and/or touch data indicative of touch input 902. Machine learned gesture model 925 can generate an output including data indicative of a gesture detection. For example, machine learned gesture model 925 can be trained, via one or more machine learning techniques, using reference data 920 as one or more constraints. By way of example, machine learned gesture model 925 can be trained using one or more sequence features, line sequences, and/or one or more respective gestures. For instance, machine learned gesture model 925 can be trained using one or more sequence features matched with one or more corresponding lines sequences and/or one or more respective gestures. In this manner, machine learned gesture model 925 can be trained via machine learning techniques, such as, for example, backpropagation using reference data 910 as one or more constraints.

Machine learned gesture model 925 can be implemented in one or more of internal electronics module 204, removable electronics module 206, and/or one or more remote computing devices. For example, the machine learned gesture model 925 can be implemented in one or more remote computing devices coupled to capacitive touch sensor 102. Machine learned gesture model 925 can be trained to detect a respective gesture based on the physical constraints of capacitive touch sensor 102. The physical constraints may identify the order, number, spacing, etc. that are associated with a particular sequence of non-crossing conductive lines defined by the conductive line pattern formed at capacitive touch sensor 102.

In accordance with some embodiments, gesture manager 910 can input touch data indicative of touch input 902 and/or one or more touch features associated with touch input 902 into machine learned gesture model 925. In response, machine learned gesture model 925 can output data indicative of a similarity to one or more of the line sequences stored in reference database 915. In addition, or alternatively, the machine learned gesture model 925 can be configured to output data indicative of an inference or detection of a respective gesture based on a similarity between touch data indicative of touch input 902 and one or more of the line sequences stored in reference database 915.

Interactive object 104 and/or a computing device in communication with interactive object 104 can initiate one or more actions based on a detected gesture. For example, the detected gesture can be associated with a navigation command (e.g., scrolling up/down/side, flipping a page, etc.) in one or more user interfaces coupled to interactive object 104 (e.g., via the capacitive touch sensor 102, the controller, or both) and/or any of the one or more remote computing devices. In addition, or alternatively, the respective gesture can initiate one or more predefined actions utilizing one or more computing devices, such as, for example, dialing a number, sending a text message, playing a sound recording etc.

Figure 10:
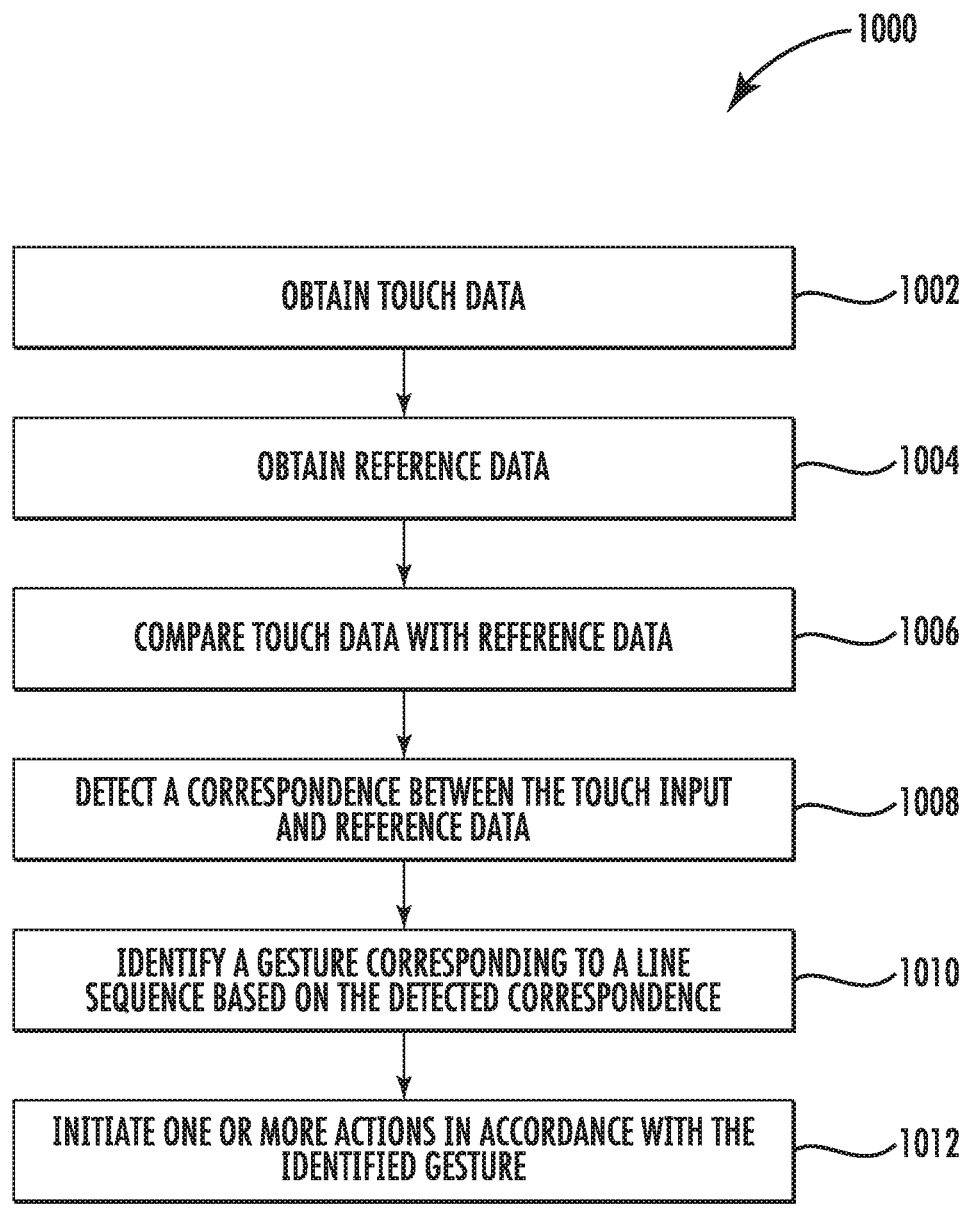
FIG. 10 depicts a flowchart depicting an example method of determining a user gesture in accordance with example embodiments of the present disclosure.

FIG. 10 depicts a flowchart depicting an example method of determining a gesture based on touch input in accordance with example embodiments of the present disclosure. One or more portion(s) of the method 1000 can be can be implemented by a computing system that includes one or more computing devices such as, for example, the computing systems described with reference to the other figures (e.g., interactive object 104, capacitive touch sensor 102, etc.). Each respective portion of the method 1000 can be performed by any (or any combination) of one or more computing devices. Moreover, one or more portion(s) of the method 1000 can be implemented as an algorithm on the hardware components of the device(s) described herein (e.g., as in FIGS. 1-3, and/or 12), for example, to detect gestures based on touch input. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 10 is described with reference to elements/terms described with respect to other systems and figures for example illustrated purposes and is not meant to be limiting. One or more portions of method 1000 can be performed additionally, or alternatively, by other systems.

At (1002), touch data is obtained. For example, touch data indicative of a touch input 902 to capacitive touch sensor 102 can be obtained. The touch data can be based at least in part on a change in capacitance associated with two or more non-crossing conductive lines 202. For example, touch input 902 to capacitive touch sensor 102 can be detected based on a change in capacitance associated with two or more non-crossing conductive lines 202. Touch data indicative of touch input 902 can be generated in response to detecting the change in capacitance at capacitive touch sensor 102. Touch data indicative of touch input 902 can include one or more touch input features associated with touch input 902. The one or more touch input features associated with touch input 902 can be identified in response to detecting the touch input 902 to capacitive touch sensor 102.

The one or more touch input features can include at least one of an order of two or more non-crossing conductive lines 202, a number of two or more non-crossing conductive lines 202, and/or one or more times corresponding to one or more of two or more non-crossing conductive lines 202. For example, capacitive touch sensor 102 can include a conductive line pattern defining one or more line sequences. Each line sequence can include one or more sequence features such as an order of non-crossing conductive lines, a number of non-crossing conductive lines, and/or a spacing between two or more non-crossing conductive lines. The one or more touch input features can correspond to the one or more sequence features of the one or more line sequences defined by a particular conductive line pattern.

At (1004), reference data 920 is obtained. For example, reference data 920 can be stored in reference database 915 and can be obtained by accessing reference database 915. Reference data 920 can correspond to at least a first line sequence, a second line sequence, and/or a third line sequence. For example, reference data 920 can include data indicative of one or more sequence features corresponding to at least one of the first line sequence, second line sequence, and/or the third line sequence.

At (1006), the touch data is compared with reference data 920. For example, the touch data indicative of the touch input 902 can be compared with reference data 920 corresponding to at least a first line sequence, a second lines sequence, and/or a third line sequence. For example, comparing the touch data indicative of the touch input 902 with the reference data 920 can include comparing touch input features associated with the touch input 902 with reference data 920. By way of example, one or more touch input features can be compared with one or more sequence features corresponding to at least one of the first line sequence, the second line sequence, and/or the third line sequence.

At (1008), a correspondence is detected between touch input 902 and the reference data 920. For example, a correspondence between touch input 902 and at least one of the first line sequence, the second line sequence, and/or the third line sequence can be detected based on comparing the touch data indicative of touch input 902 with reference data 920. For instance, determining a correspondence between touch input 902 and at least one of first line sequence, the second line sequence, and/or the third line sequence based on comparing the touch data indicative of the touch input 902 with the reference data 920 can include determining one or more corresponding features.

By way of example, one or more corresponding features can be determined between the touch data indicative of touch input 902 and at least one of the first line sequence, the second line sequence, and/or the third line sequence. The corresponding features, for example, can be indicative of a correspondence between at least one touch input feature and at least one sequence feature. For example, the corresponding features can be indicative of a touch input feature and at least one sequence feature with matching criteria. The correspondence between touch input 902 and at least one of the first line sequence, the second line sequence, and/or the third line sequence can be determined based at least in part on a number of corresponding features between the touch data indicative of touch input 902 and each of the respective line sequences.

At least the first line sequence, the second line, or the third line sequence can be identified based on the touch data indicative of the touch input 902. For example, the first line sequence, the second line sequence, and/or the third line sequence can be identified in response to touch input 902 to capacitive touch sensor 102. For example, the first line sequence, the second line sequence, and/or the third line sequence can be identified based on the detected correspondence between the touch input 902 and a respective line sequence. In addition, or alternatively, the touch data indicative of touch input 902 can be input into a machine learned gesture model 925 previously trained via one or more machine learning techniques using reference data 920 as one or more constraints. The machine learned gesture model 925 can be configured to identify the first line sequence, the second line sequence, and/or the third line sequence in response to touch input 902.

At (1010), a gesture corresponding to a line sequence is identified based on a detected correspondence. For example, a respective gesture can be determined corresponding to at least one of the first line sequence, the second line sequence, or the third line sequence. By way of example, the respective gesture corresponding to the at least one of the first line sequence, the second line sequence, or the third line sequence can be identified based on detecting the correspondence between touch input 902 and at least one of the respective line sequences. In addition, or alternatively, machine learned gesture model 925 can be configured to output a detection of a gesture based on a similarity between the touch data indicative of touch input 902 and reference data 920 associated with at least one of the first line sequence, the second line sequence, or the third line sequence. The touch data indicative of touch input 902 can be input into the machine learned gesture model 925 to obtain a respective gesture based on touch input 902.

At (1012), one or more actions are initiated in accordance with the identified gesture. For example, one or more computing devices can initiate one or more actions based at least in part on the respective gesture. By way of example, a detected gesture can be associated with a navigation command (e.g., scrolling up/down/side, flipping a page, etc.) in one or more user interfaces coupled to the interactive object 104 (e.g., via the capacitive touch sensor 102, the controller, or both) and/or any of the one or more remote computing devices. In addition, or alternatively, the respective gesture can initiate one or more predefined actions utilizing one or more computing devices, such as, for example, dialing a number, sending a text message, playing a sound recording etc.

Figure 11:
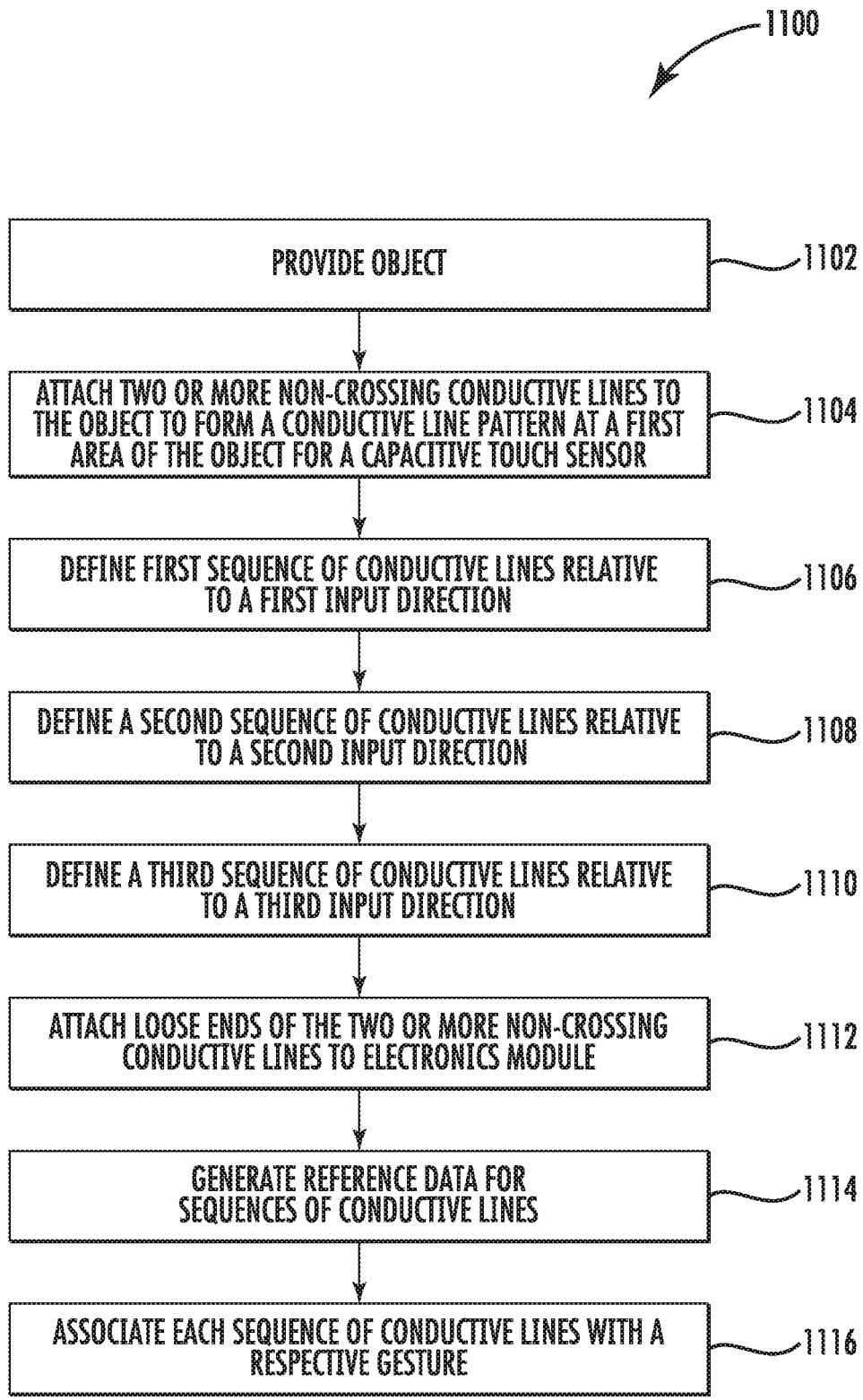
FIG. 11 depicts a flowchart depicting an example method of manufacturing an interactive textile in accordance with example embodiments of the present disclosure.

FIG. 11 is a flowchart depicting an example method of manufacturing a capacitive touch sensor 102 including two or more non-crossing conductive lines 202 in accordance with example embodiments of the present disclosure. In the example method 1100, a non-crossing conductive line pattern can be formed by positioning conductive lines within a capacitive touch sensor 102.

At (1102), an object is provided. The object can include any interactive object 104 previously discussed with reference to FIG. 1. For example, the object can include "flexible" objects, including any type of flexible object made from fabric or a similar flexible material. In addition, or alternatively, an object can include "hard" objects, such as any type of "hard" or "rigid" object made from non-flexible or semi-flexible materials, such as plastic, metal, aluminum, and so on. Moreover, in some embodiments, the object can include any combination of "flexible" and "hard" objects such as a shoe including "flexible" fabric and a "hard" sole.

At (1104), two or more non-crossing conductive lines 202 are attached to the object to form at least a first conductive line pattern at a first area of the capacitive touch sensor 102. The first conductive line pattern defines a first line sequence of two or more non-crossing conductive lines, a second line sequence of two or more non-crossing conductive lines, and a third lines sequence of two or more non-crossing conductive lines. At (1106), the first line sequence is defined relative to a first input direction. At (1108), the second line sequence is defined relative to a second input direction. And, at (1110), the third line sequence is defined relative to a third input direction.

By way of example, the two or more non-crossing conductive lines 202 can extend along a longitudinal axis to define at least the first line sequence and the second line sequence at a first area of capacitive touch sensor 102. The first and second input directions can be along a lateral axis orthogonal to the longitudinal axis. The first input direction and second input direction can be opposite directions along the longitudinal axis.

The two or more non-crossing conductive lines 202 can extend along the lateral axis to define the third line sequence relative to a third input direction at the first area of capacitive touch sensor 102. The third input direction can be orthogonal to the first input direction and second input direction. For example, the third input direction can be along the longitudinal axis. In example embodiments, the first conductive line pattern can also define a fourth line sequence of two or more non-crossing conductive lines 202. The fourth line sequence can be defined relative to a fourth input direction along the longitudinal axis. The third input direction and the fourth input direction can be opposite directions along the longitudinal axis.

The first, second, third, and fourth input directions are described for example purposes only. It is to be appreciated that a conductive line pattern can include any number of input directions and/or line sequences corresponding to a respective input direction. For example, in some embodiments, a conductive line pattern can include at least a fifth line sequence associated with a fifth input direction and a sixth line sequence associated with a sixth input direction.

The conductive line pattern defines each line sequence such that first line sequence, the second line sequence, the third line sequence, and the fourth line sequence each include one or more respective sequence features. For example, the one or more sequence features can include at least one of an order of two or more non-crossing conductive lines 202, a number of two or more non-crossing conductive lines 202, and/or one or more distances between two or more non-crossing conductive lines 202. For example, the one or more sequence features can include an order of two or more non-crossing conductive lines 202 at a portion of first conductive line pattern corresponding to at least one line sequence.

At (1112), loose ends of two or more non-crossing conductive line(s) 202 are attached to one or more electronics components. For example, conductive lines 202 may be attached directly to sensing circuitry 210. In other examples, conductive lines 202 may be attached to one or more connectors that connect to sensing circuitry 210. By way of example, the loose ends of conductive lines 202 can be collected and organized into a ribbon to provide a pitch that matches a corresponding pitch of the connection point of the electronic component. Non-conductive material of the conductive lines of the ribbon can be stripped to expose conductive wires of non-crossing conductive lines 202. After stripping the nonconductive material, the connection points of the electronic component can be attached to the conductive wires. By way of example, connection points of the electronic component can be bonded to the conductive wires of a ribbon. The conductive lines proximate the ribbon can then be sealed using a UV-curable or heat-curable epoxy, and the electronic component and the ribbon can be encapsulated to capacitive touch sensor 102 with a water-resistant material, such as plastic or polymer.

At (1114), reference data 920 is generated for each line sequence defined by the two or more non-crossing conductive lines. For example, reference data 920 can include one or more sequence features associated with each line sequence defined by a particular conductive line pattern. By way of example, reference data 920 for a particular conductive line pattern can be generated by identifying one or more sequence features associated with each line sequence defined by the particular conductive line pattern. In example embodiments, reference data 910 can be stored in a reference database 915.

At (1116), each line sequence defined by the two or more non-crossing conductive lines 202 is associated with a respective gesture. For example, a respective gesture for each line sequence defined by the two or more non-crossing conductive lines 202 can be determined based on the respective input direction associated with each line sequence. For example, a respective gesture can include a swipe across touch capacitive sensor 102 in a respective input direction. The respective gesture can be stored in reference database 915 corresponding to one or more respective line sequences.

Figure 12:
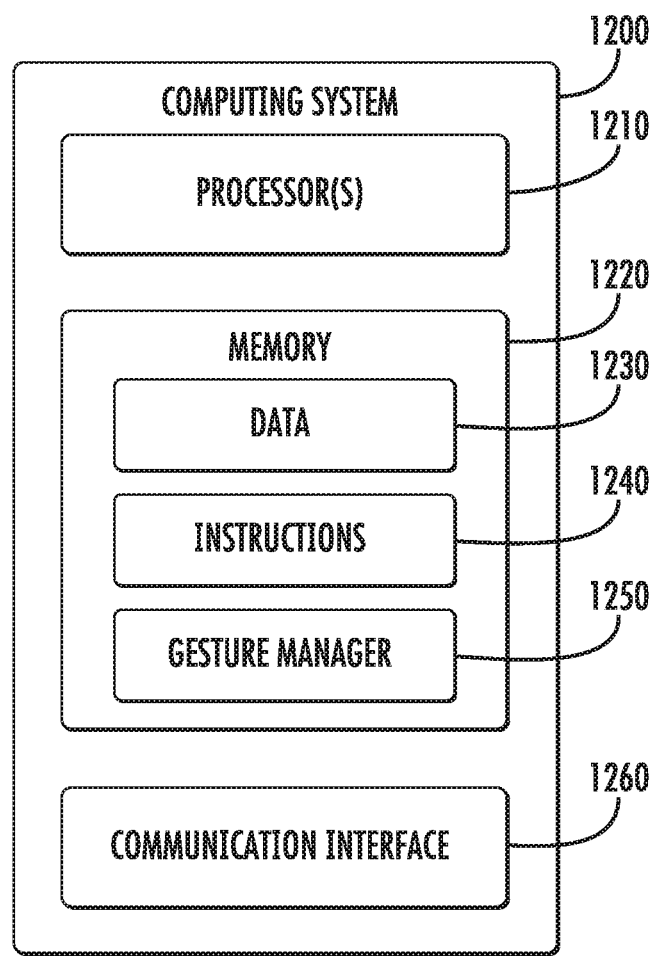
FIG. 12 depicts a block diagram of an example computing system that can be used to implement any type of computing device as described herein.

FIG. 12 illustrates various components of an example computing system 1200 that can implement any type of client, server, and/or computing device described herein. In embodiments, computing system 1200 can be implemented as one or a combination of a wired and/or wireless wearable device, System-on-Chip (SoC), and/or as another type of device or portion thereof. Computing system 1200 may also be associated with a user (e.g., a person) and/or an entity that operates the device such that a device describes logical devices that include users, software, firmware, and/or a combination of devices.

Computing system 1200 includes a communication interface 1260 that enables wired and/or wireless communication of data 1230 (e.g., received data, data that is being received, data scheduled for broadcast, data packets of the data, etc.). Data 1230 can include configuration settings of the device, media content stored on the device, and/or information associated with a user of the device. Media content stored on computing system 1200 can include any type of audio, video, and/or image data. Computing system 1200 includes one or more data inputs via which any type of data, media content, and/or inputs can be received, such as human utterances, touch data generated by capacitive touch sensor 102, user-selectable inputs (explicit or implicit), messages, music, television media content, recorded video content, and any other type of audio, video, and/or image data received from any content and/or data source.

Communication interfaces can be implemented as any one or more of a serial and/or parallel interface, a wireless interface, any type of network interface, a modem, and as any other type of communication interface. Communication interfaces provide a connection and/or communication links between computing system 1200 and a communication network by which other electronic, computing, and communication devices communicate data with computing system 1200.

Computing system 1200 includes one or more processors 1210 (e.g., any of microprocessors, controllers, and the like), which process various computer-executable instructions to control the operation of computing system 1200 and to enable techniques for, or in which can be embodied, by interactive objects, such as interactive object 104. Alternatively, or in addition, computing system 1200 can be implemented with any one or combination of hardware, firmware, or fixed logic circuitry that is implemented in connection with processing and control circuits. Although not shown, computing system 1200 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 1200 also includes memory 1220 which may include computer-readable media, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Memory 1220 may also include a mass storage media device of computing system 1200.

Computer-readable media provides data storage mechanisms to store device data, as well as computer-readable instructions 1240 which can implement various device applications and any other types of information and/or data related to operational aspects of computing system 1200. For example, an operating system can be maintained as a computer application with computer-readable media and executed on processors 1210. Device applications may include a device manager, such as any form of a control application, software application, signal-processing and control module, code that is native to a particular device, a hardware abstraction layer for a particular device, and so on.

Memory 1220 may also include a gesture manager 1250. Gesture manager 1250 is capable of interacting with applications through capacitive touch sensor 102 to activate various functionalities associated with computing device 106 and/or applications through touch input (e.g., gestures) received by interactive object 104. Gesture manager 1250 may be implemented at a computing device 106 that is local to interactive object 104, or remote from interactive object 104.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system, comprising:
   a capacitive touch sensor comprising two or more non-crossing conductive lines that form at least a first conductive line pattern at at least a first area of the capacitive touch sensor, wherein the first conductive line pattern comprises a first line sequence of the two or more non-crossing conductive lines relative to a first input direction, a second line sequence of the two or more non-crossing conductive lines relative to a second input direction, and a third line sequence of the two or more non-crossing conductive lines relative to a third input direction;
   one or more computer-readable media that store instructions that, when executed by one or more processors, cause the one or more processors to perform operations, the operations comprising:
      obtaining touch data indicative of a touch input to the capacitive touch sensor, the touch data being based at least in part on a change in capacitance associated with the two or more non-crossing conductive lines;
      identifying at least one of the first line sequence, the second line sequence, or the third line sequence based on the touch data; and
      determining a respective gesture corresponding to at least one of the first line sequence, the second line sequence, or the third line sequence.

2. The computing system of claim 1, wherein the two or more non-crossing conductive lines extend in at least a first direction to define at least the first line sequence and the second line sequence at the first area of the capacitive touch sensor.

3. The computing system of claim 2, wherein the two or more non-crossing conductive lines extend in at least a second direction to define at least a third line sequence at the first area of the capacitive touch sensor.

4. The computing system of claim 1, wherein the first input direction and the second input direction are opposite directions along a common axis.

5. The computing system of claim 1, wherein the third input direction is orthogonal to the first input direction and the second input direction.

6. The computing system of claim 1, wherein the first conductive line pattern comprises a fourth line sequence of the two or more non-crossing conductive lines relative to a fourth input direction.

7. The computing system of claim 6, wherein the third input direction and the fourth input direction are opposite directions along a common axis.

8. The computing system of claim 1, wherein the first line sequence, the second line sequence, and the third line sequence each comprise one or more sequence features.

9. The computing system of claim 8, wherein the one or more sequence features comprise at least one of an order of the two or more non-crossing conductive lines, a number of the two or more non-crossing conductive lines, or one or more distances between the two or more non-crossing conductive lines.

10. The computing system of claim 9, wherein the one or more sequence features comprise an order of the two or more non-crossing conductive lines at a portion of the first conductive line pattern corresponding to at least one line sequence.

11. A computer-implemented method of determining a user gesture, comprising:
    obtaining, by one or more computing devices, data indicative of a touch input to a capacitive touch sensor, the capacitive touch sensor comprising two or more non-crossing conductive lines forming at least a first line sequence, a second line sequence, and a third line sequence at a first area of the capacitive touch sensor;
    comparing, by the one or more computing devices, the data indicative of the touch input with reference data corresponding to the first line sequence, the second line sequence, and the third line sequence;
    detecting, by the one or more computing devices, a correspondence between the touch input and at least one of the first line sequence, the second line sequence, or the third line sequence based on comparing the data indicative of the touch input with the reference data;
    identifying, by the one or more computing devices, a respective gesture corresponding to the at least one of the first line sequence, the second line sequence, or the third line sequence based on detecting the correspondence; and
    initiating, by the one or more computing devices, one or more actions based at least in part on the respective gesture.

12. The computer implemented method of claim 11, further comprising:
    identifying, by the one or more computing devices, one or more touch input features associated with the touch input.

13. The computer implemented method of claim 12, wherein the one or more touch input features comprise at least one of an order of the two or more non-crossing conductive lines, a number of the two or more non-crossing conductive lines, and one or more times corresponding to one or more of the two or more non-crossing conductive lines.

14. The computer implemented method of claim 11, wherein the reference data comprises data indicative of one or more sequence features corresponding to the at least one of the first line sequence, the second line sequence, or the third line sequence.

15. The computer implemented method of claim 12, wherein comparing the touch input with the reference data comprises:
   comparing, by the one or more computing devices, one or more touch input features with one or more sequence features corresponding to the at least one of the first line sequence, the second line sequence, or the third line sequence.

16. The computer-implemented method of claim 15, wherein determining a correspondence between the touch input and the at least one of the first line sequence, the second line sequence, or the third line sequence based on comparing the data indicative of the touch input with the reference data comprises:
   determining, by the one or more computing devices, one or more corresponding features between the data indicative of the touch input and the at least one of the first line sequence, the second line sequence, or the third line sequence, the corresponding features indicative of a correspondence between at least one touch input feature and at least one sequence feature; and
   determining, by the one or more computing devices, the correspondence between the touch input and at least one of the first line sequence, the second line sequence, or the third line sequence based, at least in part, on a number of corresponding features between the data indicative of the touch input and each of the respective line sequences.

17. A computing device comprising:
   one or more processors;
   one or more communication interfaces communicatively coupled to at least one capacitive touch sensor comprising two or more non-crossing conductive lines, the two or more non-crossing conductive lines forming at least a first line sequence, a second line sequence, and a third line sequence at a first area of the at least one capacitive touch sensor; and
   one or more computer-readable media that store instructions that, when executed by the one or more processors, cause the one or more processors to perform operations, the operations comprising:
      detecting touch input to the capacitive touch sensor based on a change in capacitance associated with the two or more non-crossing conductive lines;
      identifying at least one of the first line sequence, the second line sequence, or the third line sequence in response to the touch input to the capacitive touch sensor;
      determining a respective gesture corresponding to at least one of the first line sequence, the second line sequence, or the third line sequence; and
      initiating one or more actions based at least in part on the respective gesture.

18. The computing device of claim 17, further comprising a reference database comprising reference data indicative of one or more sequence features corresponding to the at least one of the first line sequence, the second line sequence, or the third line sequence.

19. The computing device of claim 18, wherein the identifying at least one of the first line sequence, the second line sequence, or the third line sequence in response to the touch input to the capacitive touch sensor comprises:
   obtaining data indicative of the touch input to the capacitive touch sensor;
   inputting the data indicative of the touch input into a machine learned gesture model configured to detect the first line sequence, the second line sequence, or the third line sequence in response to the touch input, the machine learned gesture model previously trained via one or more machine learning techniques using the reference data as one or more constraints.

20. The computing device of claim 19, wherein the machine learned gesture model is configured to output a detection of a gesture based on a similarity between the data indicative of the touch input and reference data associated with the at least one of the first line sequence, the second line sequence, or the third line sequence.

* * * * *